United States Patent [19]
Halverson, Jr. et al.

[11] Patent Number: 5,574,930
[45] Date of Patent: Nov. 12, 1996

[54] COMPUTER SYSTEM AND METHOD USING FUNCTIONAL MEMORY

[75] Inventors: Richard P. Halverson, Jr.; Art Y. Lew, both of Honolulu, Hi.

[73] Assignee: University of Hawaii, Honolulu, Hi.

[21] Appl. No.: 290,027

[22] Filed: Aug. 12, 1994

[51] Int. Cl.$^6$ .................................................. G06F 13/00
[52] U.S. Cl. .................. 395/800; 395/438; 364/230.6; 364/244.9; 364/260.0; 364/DIG. 1
[58] Field of Search .......................... 395/800, DIG. 1, 395/200.15, 311, 404, 432, 438, 497.01, 800, 827, 840, 843, 871; 365/189.01, 189.02, 189.04, 230.01, 230.62

[56] References Cited

U.S. PATENT DOCUMENTS

| | | | |
|---|---|---|---|
| 4,502,118 | 2/1985 | Hagenmaier et al. | 395/700 |
| 4,807,183 | 2/1989 | Kung et al. | 395/312 |
| 5,208,491 | 5/1993 | Ebeling et al. | 307/465 |
| 5,210,854 | 5/1993 | Beaverton et al. | 395/500 |
| 5,321,845 | 6/1994 | Sawase et al. | 395/800 |
| 5,361,373 | 11/1994 | Gilson | 395/800 |
| 5,386,518 | 1/1995 | Reagle et al. | 395/310 |
| 5,511,173 | 4/1996 | Yamausa et al. | 395/375 |

*Primary Examiner*—Alpesh M. Shah
*Attorney, Agent, or Firm*—Flehr, Hohbach, Test, Albritton & Herbert

[57] ABSTRACT

A computer system has a central processing unit and a functional memory coupled to the central processing unit's memory access circuitry. The functional memory includes random access memory circuitry connected in parallel with field programmable gate array circuitry. The field programmable gate array circuitry receives configuration data from the central processing unit. The configuration data defines what memory addresses the field programmable gate array circuitry will be responsive to and what computational functions the field programmable gate array circuitry will perform. The field programmable gate array circuitry includes input registers for storing data received from the central processing unit when the central processing unit's memory access circuitry asserts a first set of memory addresses defined by the configuration data and result output circuitry for communicating the results computed by the field programmable gate array circuitry. The result output circuitry outputs result data to the central processing unit when the central processing unit's memory access circuitry asserts a second set of memory addresses defined by the configuration data. The functional memory includes access circuitry for routing data signals from the central processing unit to both the random access memory circuitry and the field programmable gate array circuitry in parallel, and for routing data signals from both the random access memory circuitry and the field programmable gate array circuitry to the central processing unit. The field programmable gate array circuitry can be reprogrammed to support different computations for different programs.

11 Claims, 17 Drawing Sheets

|  | Rule: | 1 2 3 4 5 |
|---|---|---|
| Condition Stubs 502 | lambda =<br>k = 1<br>j = k<br>t > t1 | 0 1 1 1 1<br>– T F F F<br>– – T F F<br>– – – T F |
| Action Stubs 506 | k := n<br>j := 1<br>k := k–1<br>a[j] := t1<br>a[j+1] := t<br>j := j+1<br>t :=a[j]<br>t1 := a a[j+1]<br>exit<br>lambda := | X – – – –<br>X – X – –<br>– – X – –<br>– – – X –<br>– – – X –<br>– – – X X<br>X – X X X<br>X – X X X<br>– X – – –<br>1 – – – – |

Condition Entries 504

Action Entries 508

| Name | Address (hex) | Dimension | Operand Width | Functional Memory |
|---|---|---|---|---|
| lambda | 0000 | — | 2 bit | input register |
| @rule | 0002 | — | 7 bit | expression output |
| n | 0004 | — | 8 bit | — |
| a | 0006 | [0..50] | 8 bit | address constant |
| j | 006C | — | 8 bit | input register |
| k | 006E | — | 8 bit | input register |
| t | 0070 | — | 8 bit | input register |
| t1 | 0072 | — | 8 bit | input register |
| k-1 | 0074 | — | 8 bit | expression output |
| @a[j] | 0076 | — | 9 bit | expression output |
| @a[j+1] | 0078 | — | 9 bit | expression output |
| j+1 | 007A | — | 8 bit | expression output |

FIG. 5B

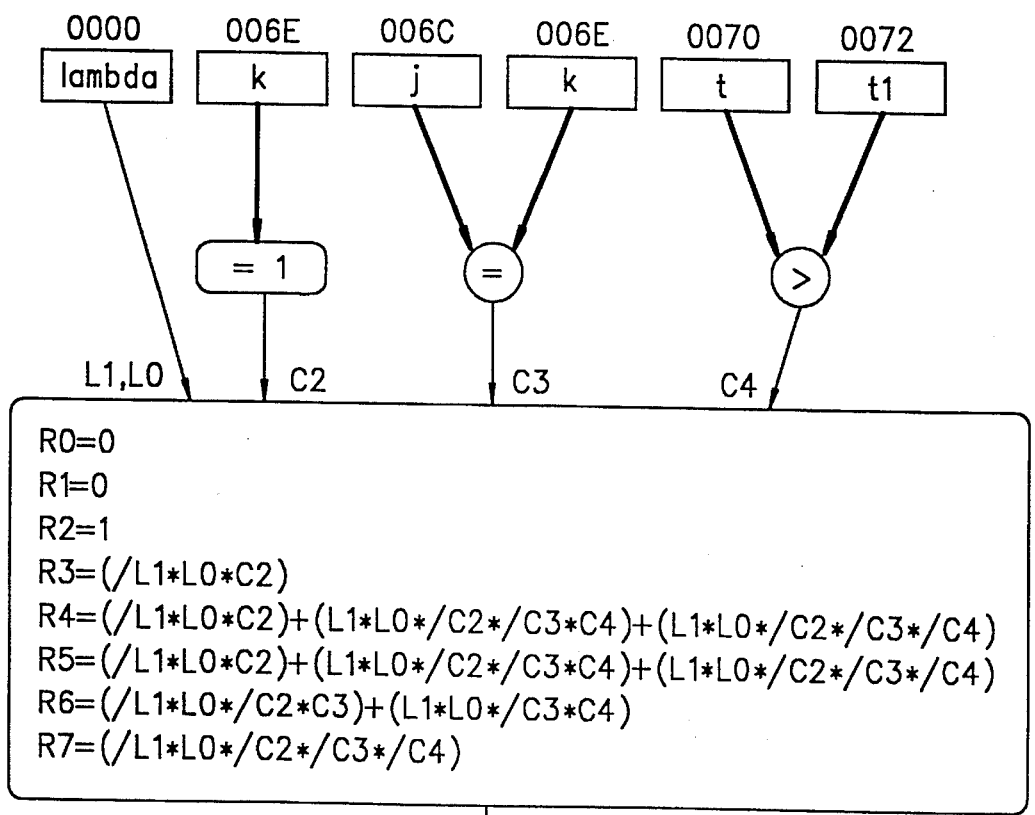

| Entry | Statement | mP Inst | Des Addr | Source | Cyc |
|---|---|---|---|---|---|
| Rule1 | k := n | DD | 006E | 0004 | 2 |
| | j := 1 | DC | 006C | 0001 | 2 |
| | lambda := 1 | DC | 0000 | 0001 | 2 |
| | t := a[j] | DI | 0070 | 0076 | 3 |
| | t1 := a[j+1] | DI | 0072 | 0078 | 3 |
| | goto @rule | JI | 0002 | – | 2 |
| Rule2 | EXIT | EX | – | – | 2 |
| Rule3 | j := 1 | DC | 006C | 0001 | 2 |
| | k := k-1 | DE | 006E | 0074 | 2 |
| | t := a[j] | DI | 0070 | 0076 | 3 |
| | t1 := a[j+1] | DI | 0072 | 0078 | 3 |
| | goto @rule | JI | 0002 | – | 2 |
| Rule4 | a[j] := t1 | ID | 0076 | 0072 | 3 |
| | a[j+1] := t | ID | 0078 | 0070 | 3 |
| | j := j+1 | DE | 006C | 007A | 2 |
| | t :=a[j] | DI | 0070 | 0076 | 3 |
| | t1:= a[j+1] | DI | 0072 | 0078 | 3 |
| | goto @rule | JI | 0002 | – | 2 |
| Rule5 | j := j+1 | DE | 006C | 007A | 2 |
| | t :=a[j] | DI | 0070 | 0076 | 3 |
| | t1 := a[j+1] | DI | 0072 | 0078 | 3 |
| | goto @rule | JI | 0002 | – | 2 |

Op Code Register — 1206

| Write FM | DBUS Mux | ADDR Mux | IBUS Mux | Destination Reg Sel | Spare | Done |
|---|---|---|---|---|---|---|
| 1208 | 1210 | 1212 | 1214 | 1300 | | 1210 |

| Bit State | Operation Accomplished |
|---|---|
| Write FM = 1 | RAM and possibly a XILINX register are written |
| DBUS Mux = 0 | Microinstruction constant field is written |
| DBUS Mux = 1 | Contents of the data output register is written |
| ADDR Mux = 0 | Microinstruction constant field defines the address |
| ADDR Mux = 1 | Memory address register defines the address |
| IBUS Mux = 0 | Microinstruction constant field drives internal data bus |
| IBUS Mux = 1 | RAM/XILINX output drives internal data bus |
| Destination Reg Select = 01 | Data output register is written |
| Destination Reg Select = 10 | Memory address register is written |
| Destination Reg Select = 11 | Program counter is written |
| Done = 1 | System processor can see mP is done executing |

| Type | Example | Operand #1 | Operand #2 | µCode Instructions | # Cycles |
|---|---|---|---|---|---|
| DC | i:=1 | Direct Address e.g., i | Constant e.g., 1 | DOR ← 1<br>(i) ← DOR | 2 |
| DD | i:=j | Direct Address e.g., i | Direct Address e.g., j | DOR ← (j)<br>(i) ← DOR | 2 |
| DE | i:=j+k | Direct Address e.g., i | Direct Address e.g., j+k | DOR ← (j+k)<br>(i) ← DOR | 2 |
| DI | i:=a[j] | Direct Address e.g., i | Indirect Address e.g., @a[j] | MAR ← (@a[j])<br>DOR ← (MAR)<br>(i) ← DOR | 3 |
|  | "a[j+1]":=a[j+1] | Direct Address e.g., "a[j+1]" | Indirect Address e.g., @a[j+1] | MAR ← (@a[j+1])<br>DOR ← (MAR)<br>("a[j+1]") ← DOR | 3 |
| IC | a[i]:=1 | Indirect Address e.g., @a[i] | Constant e.g., 1 | MAR ← (@a[i])<br>(MAR) ← 1 | 2 |
| ID | a[i+1]:=j | Indirect Address e.g., @a[i+1] | Direct Address e.g., j | MAR ← (@a[i+1])<br>DOR ← (j)<br>(MAR) ← DOR | 3 |
| IE | a[i+1]:=j+k | Indirect Address e.g., @a[i+1] | Direct Address e.g., j+k | MAR ← (@a[i+1])<br>DOR ← (j+k)<br>(MAR) ← DOR | 3 |
| II | a[i]:=a[i+1] | Indirect Address e.g., @a[i] | Indirect Address e.g., @a[i+1] | MAR ← (@a[i+1])<br>DOR ← (MAR)<br>MAR ← (@a[i])<br>(MAR) ← DOR | 4 |
| JI | GOTO (location) | Indirect Address e.g., location | N/A | µPC ← (location)<br>NOP* | 2 |
| EX | HALT | N/A | N/A | µPC ← µPC<br>µPC ← µPC−4 | 2 |

*−necesary because of pipelining

COMPUTER SYSTEM AND METHOD USING FUNCTIONAL MEMORY

The present invention relates generally to computer systems and memory architectures for computer systems, and particularly to a system and method of using field programmable gate arrays to supplement the computational capability of a central processing unit and to perform simultaneous expression computations.

BACKGROUND OF THE INVENTION

A processor is a functional unit within a computer that interprets and executes instructions. In serial processors, instructions are processed sequentially, one at a time, even when the result or outcome of one instruction is independent of another instruction. In systems with parallel processors, performance is improved by processing unrelated instructions simultaneously within the same interval of time.

Parallel processing is often used in prior art systems that are customized to perform a small range of specific tasks, such as image processing or pattern matching. Since these types of functions require many small customized parallel processing elements, implementing them in fixed circuitry requires many parallel circuits.

Traditional parallel data processors execute simultaneously with a main processor instructions that are unrelated, that is, not dependent on the result of the other. Thus, the parallelism in such systems is at the processor level. In other words, within each processor, computations are still performed sequentially and by the processor. To perform computations in traditional memory/processor configurations, data must be brought from the memory to the processor. The processor then performs all the necessary computations and writes the results back to the memory. Traditional Parallel Processors have fixed circuitry and are not re-programmable at the circuitry level.

Field programmable gate arrays are Very Large Scale Integrated (VLSI) circuit chips having large numbers of user configurable circuit elements. Field programmable gate arrays allow users to change the connections between circuit elements and circuit configuration parameters at a hardware level in a matter of milliseconds.

The use of field programmable gate arrays to perform various computations is well known, as is the use of neural networks and various parallel CPU computer architectures. The present invention is not a replacement for field programmable gate arrays and neural networks, but is an architecture and methodology for using field programmable gate arrays in a manner that facilitates reconfiguration of the field programmable gate arrays and that makes the use of field programmable gate arrays in general purpose computer systems cost effective.

Definitions of the following terms used in this document are provided to assist the reader:

Compiler: A software program that translates a source program into an executable program.

Execute: To carry out (perform) an instruction or program.

Memory: (main storage) all of the addressable storage space in a processing unit and other internal storage that is used to execute instructions.

Millisecond: One thousandth of a second.

Operand: An entity on which an operation is performed.

Parallel: Pertaining to a process in which multiple events or computations occur within the same interval of time, each handled by a separate but similar functional unit.

Parallel processing: The concurrent or simultaneous execution of two or more processes in parallel computation units. Contrast with serial processing.

Processor: A functional unit that interprets and executes instructions; one or more integrated circuits that process instructions and perform a task.

Register: A part of internal storage having a specific storage capacity and intended for a specific purpose.

Serial processing: Pertaining to sequential or consecutive execution of two or more processes in a single device.

SUMMARY OF THE INVENTION

The present invention provides "expression level" parallel processing capabilities to computers through the use of field programmable gate arrays (FPGAs) that are dynamically configured to perform the computations associated with application programs. Programs that would otherwise be performed by serial data processing are divided into steps to be performed by a standard or reduced instruction set CPU (central processing unit) and computations to be performed in parallel by the FPGAs.

Although the concept of parallel processing and the use of field programmable gate arrays is not new, the present invention differs from other parallel processing implementations by a unique division of labor between a main data processor and a "functional memory". The functional memory of the present invention is constructed by connecting field programmable gate arrays in parallel with conventional random access memory (RAM), and is used by the main processor of a computer for simultaneous computation of the expressions in the user's computer programs. Functional memory allows program expressions to be computed in parallel in field programmable gate arrays as opposed to sequentially by the main processor.

In summary, the present invention is a computer system having a central processing unit, including memory access circuitry for asserting memory addresses and for writing and reading data to and from memory devices at asserted memory addresses. A functional memory is coupled to the central processing unit's memory access circuitry. The functional memory includes random access memory circuitry connected in parallel with field programmable gate array circuitry.

The field programmable gate array circuitry receives configuration data from the central processing unit for configuring the field programmable gate array circuitry. The configuration data defines what memory addresses the field programmable gate array circuitry will be responsive to and what computational functions the field programmable gate array circuitry will perform. Thus, the addresses that are "memory mapped" to the field programmable gate array circuitry are dynamically assigned by the central data processor.

The field programmable gate array circuitry includes input registers for storing data received from the central processing unit when the central processing unit's memory access circuitry asserts a first set of memory addresses defined by the configuration data and result output circuitry for communicating the results computed by the field programmable gate array circuitry. The result output circuitry communicates output result data to the central processing unit when the central processing unit's memory access circuitry asserts a second set of memory addresses defined by the configuration data.

Thus, when the main processor writes data into the first set of memory addresses, the data is stored in both the RAM and in the input registers of the field programmable gate array. The FPGA input registers generally are used to store operands to expressions that are computed in the FPGAs. When the main processor reads from the second set of memory addresses, selected locations will be output from the FPGAs instead of the RAM.

The functional memory includes access circuitry for routing data signals from the central processing unit to both the random access memory circuitry and the field programmable gate array circuitry in parallel, and for routing data signals from both the random access memory circuitry and the field programmable gate array circuitry to the central processing unit.

The functional memory is in essence "a spreadsheet computer", where most locations simply store data while others contain formulas and display expression results when read. Thus results of expressions appear at their own memory mapped addresses. Like spreadsheet cells, the memory mapped addresses assigned to the function memory's FPGAs can be programmed to be the calculated result of an expression for which other memory mapped locations are the arguments.

In a preferred embodiment, a Decision-Table (DT) language is used as a high level source programming language. The decision table language is a variation of Standard Pascal. The decision table programming method is used because it simplifies loop address computation for field programmable gate array implementation, and because any computer program can be expressed in a decision table form.

A functional memory compiler translates high level decision table programs into field programmable gate array source files. When a decision table program is compiled, statements are parsed into a sequence of move instructions, and expressions are parsed into dataflow implementations of combinational logic functions for computing an expression. Programmers using the decision table language do not need combinational logic design experience, only an understanding of how to write decision table programs.

The computer's processor may be a "minimal processor" since most or all mathematical and logical computations can be performed by the FPGAs. Since the functional memory performs most or all expression computations (i.e., mathematical and logic computations), the main processor only needs to execute Move and Jump instructions to move data from one memory location to another and to control overall program flow. The functional memory, which may be implemented as an add-on board that can be placed in existing desktop computers, acts as a co-processor. The co-processor performs multiple computations simultaneously, thus improving the performance of the machine.

BRIEF DESCRIPTION OF THE DRAWINGS

Additional objects and features of the invention will be more readily apparent from the following detailed description and appended claims when taken in conjunction with the drawings, in which:

FIG. 4 illustrates an example of a decision table program.

FIGS. 5A–5D illustrates various stages and aspects of decision table compilation.

FIG. 12 illustrates the microinstruction control register.

FIG. 15 represents a minimal set of move and control instructions for use by a minimal processor for implementing any program.

DETAILED DESCRIPTION OF THE PREFERRED EMBODIMENTS

Figure 1:
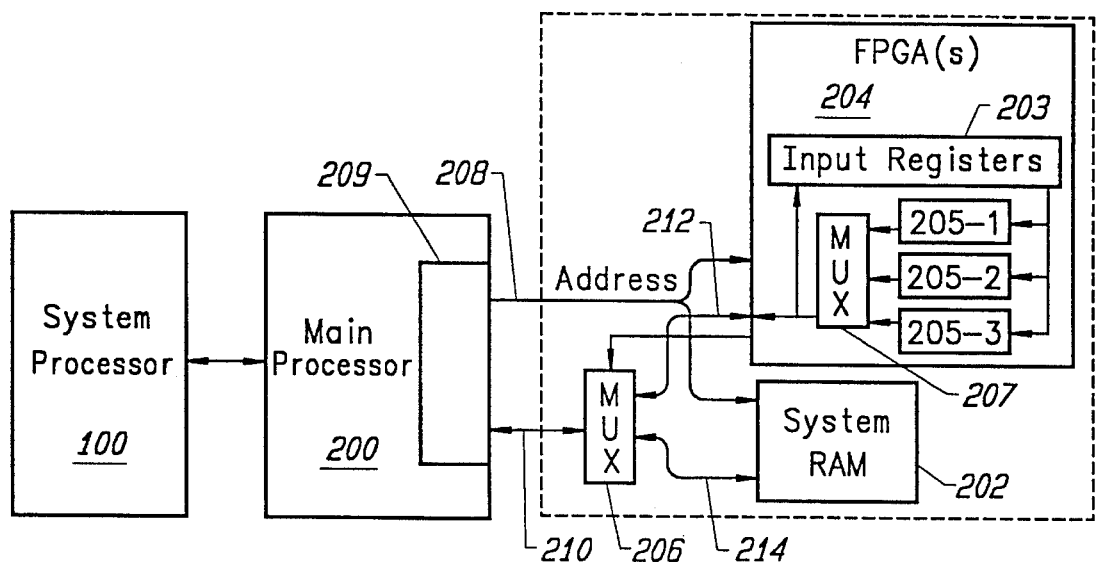
FIG. 1 illustrates the implementation of functional memory using a multiplexer.

Referring to FIG. 1, a main processor 200 is connected to a memory (RAM) 202 via a standard address bus 208 and a data bus 210. Field programmable gate arrays 204 are connected in parallel (on the same address bus 208) with the RAM 202. The main processor 200 includes memory access circuitry 209 for asserting memory addresses and for writing and reading data to and from memory (and other) devices at asserted memory addresses.

When the main processor 200 writes to the RAM 202, selected data can simultaneously be captured in input registers 203 in the field programmable gate arrays 204. The computation is then performed in the field programmable gate array 204 registers. The results of the computations are output on bus 212 from field programmable gate array 204 to multiplexer (MUX) 206 and read by the main processor 200 through the data bus 210. Since expression computations are performed in the field programmable gate arrays 204, the main processor 200 is used primarily for reading and writing data to and from memory 202, and for reading and writing data to registers and from computation output ports in the field programmable gate arrays 204 for the purpose of retrieving computation results and for sending input data to the field programmable gate arrays 204.

The main processor 200 may be connected to a system processor 100 that downloads programs to be executed into the main processor 200 and the FPGAs 204, as will be described in more detail below.

Figure 2:
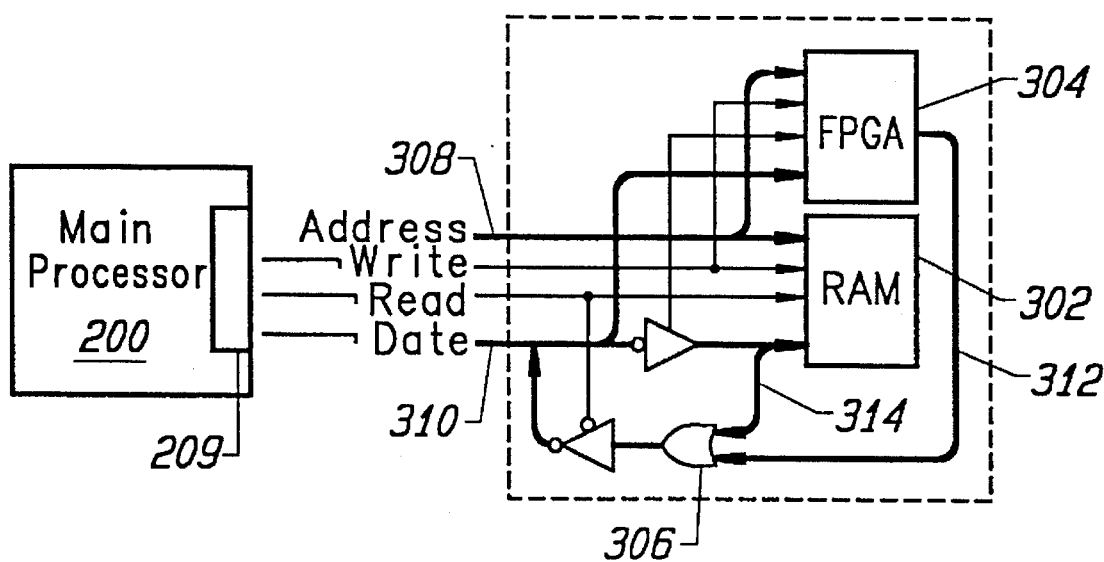
FIG. 2 illustrates the implementation of functional memory using OR gates.

FIG. 2 illustrates the implementation of functional memory using an array of OR gates 306 (i.e., one for each datat bit) instead of the multiplexer 206 of FIG. 2. The main processor 200 is connected to RAM 302 and field programmable gate arrays 304 via an address bus 308 and a data bus 310. The field programmable gate array 304 is connected in parallel with the RAM 302. When more than one FPGA is used, the data outputs of the multiples FPGAs are wire ORed prior to their connection to the inputs of the OR gates 306.

The outputs of the field programmable gate array 304 and RAM 302 are logically ORed. When data are written into the RAM 302 via the data bus 310, they may be captured in registers in the field programmable gate array 304 if they are to be used in an expression computation. Each of the computational circuits in the field programmable gate array 304 have an output port that is assigned a unique address. When those assigned addresses also correspond to RAM addresses, zero values are stored in the RAM locations which correspond to FPGA output addresses prior to performing any computations. Furthermore, when an FPGA 304 is configured to have more than one expression computation circuit 205 (see FIG. 1), the output ports of the expression computation circuits 205 are all coupled to an output multiplexer 207 (see FIG. 1) inside the FPGA 204 that is, in turn, coupled to the multiplexer 206 (FIG. 1) or OR gate 306.

The RAM's output data lines 314 and the field programmable gate array's output lines 312 are inputs to OR gate 306. The field programmable gate array 304 is configured to outputs a value of zero on data output lines 312 when data is read from RAM 302. When reading expression results from the FPGA 304, the RAM 302 outputs a value of zero on lines 314 so that only the field programmable gate array 304 outputs are read. Multiple field programmable gate arrays 304 can be attached to a single RAM 302 as long as only one field programmable gate array drives its outputs for any given expression result address read by the main processor.

Figure 3:
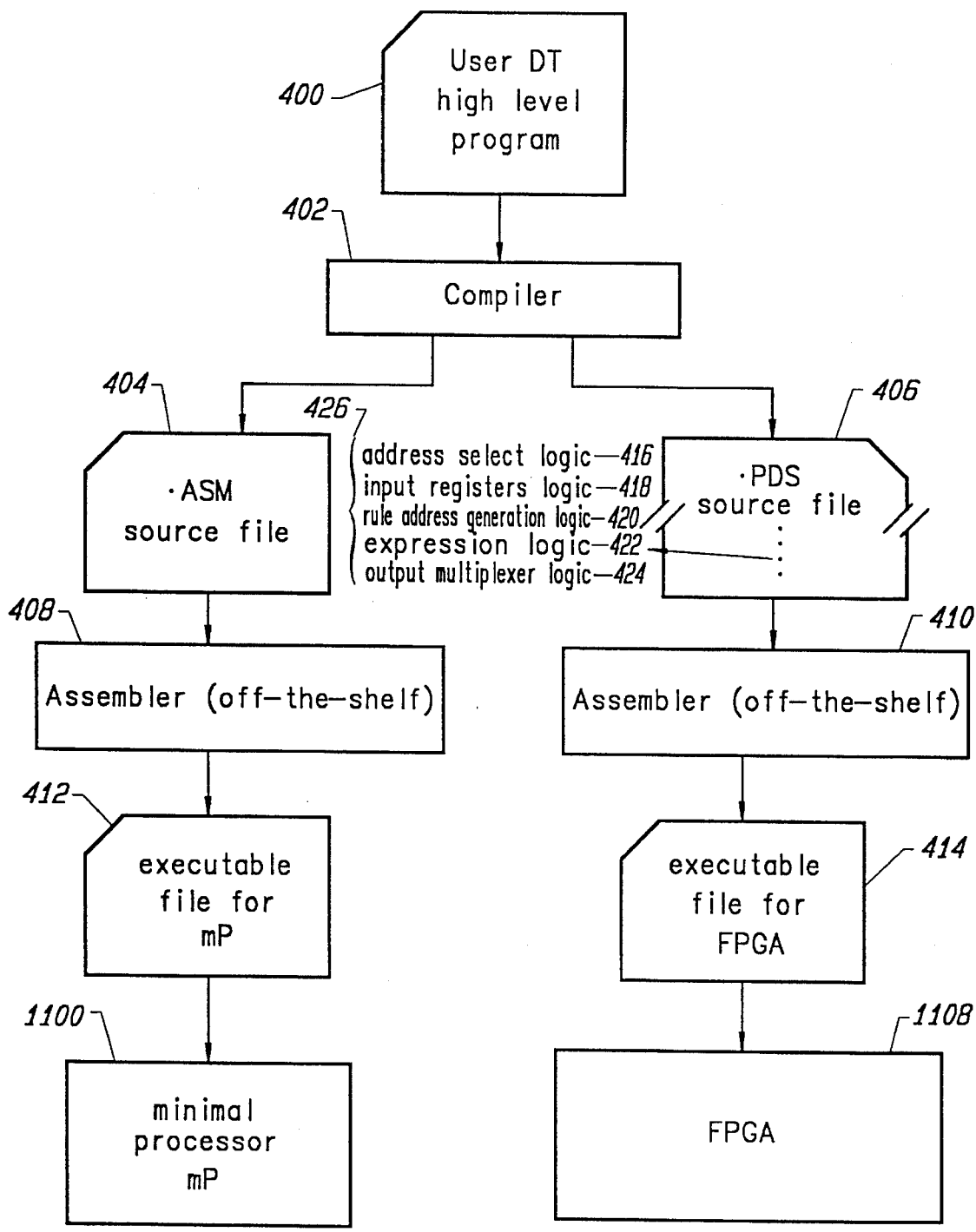
FIG. 3 illustrates, in a general sense, the process of producing a field programmable gate array source file from the user's high level source code.

FIG. 3 shows, in a general form, the process of producing a field programmable gate array source file from the user's high level program. A user's decision table program 400 is compiled by the functional memory compiler 402. The compiler 402 generates two source files: An .ASM source file 404 for the main processor 1100 (see FIG. 10) and an .PDS source file 406 for field programmable gate array 1108 (see FIG. 10). The .ASM file 404 is then assembled by the assembler 408 to generate an executable file 412. The field programmable gate array source file 406 is preferably a PALASM (programmable array logic assembler) language source file in .PDS format that contains compiler generated equations 426. These equations, collectively are referred to as Combinational Logic equations. The combinational logic equations include the Address Select Logic equations 416, Input Register Logic equations 418, Rule Address Generation Logic equations 420, Expression Logic equations 422, and Output Multiplexer Logic equations 424. Field programmable gate array logic equations 426 can be different for different user programs 400.

An PALASM assembler 410 assembles the .PDS file 406 and produces an executable file 414 for use in the field programmable gate array 1108. The executable file 414 is loaded into the FPGA 1108.

FIG. 4 illustrates a Decision Table program 400. A decision table 400 has four quadrants. The upper left quadrants contains condition stubs 502, which are expressions that can be evaluated simultaneously. The upper right quadrants lists the condition entries 504, which define columns of possible expression combinations. Multiple "T" entries in a column indicated logically ANDed condition stubs which must be true for the corresponding "rule" (i.e., column) to "fire".

The lower right quadrant contains the action entries 508 that indicates row by row with X's which action stub statements 506 (in the lower left) are to be executed when the conditions are satisfied. The right half of the table (504 and 508, the entry table) is an AND-OR array, containing boolean inputs and outputs.

A decision table program 400 executes by first evaluating all the condition stubs 502 simultaneously. The results of the condition stub evaluations are used as inputs to the condition entries 504, which are then used to select a unique rule. When a rule is selected (rule 1, 2, 3, 4, or 5), it causes the action stubs 506 with an X in their action entries 508 to execute. The expressions on the right side of all the action stubs are computed simultaneously. The whole process repeats (starting with the reevaluation of the condition stubs 502) until a selected rule causes the program to terminate.

Figure 5A:
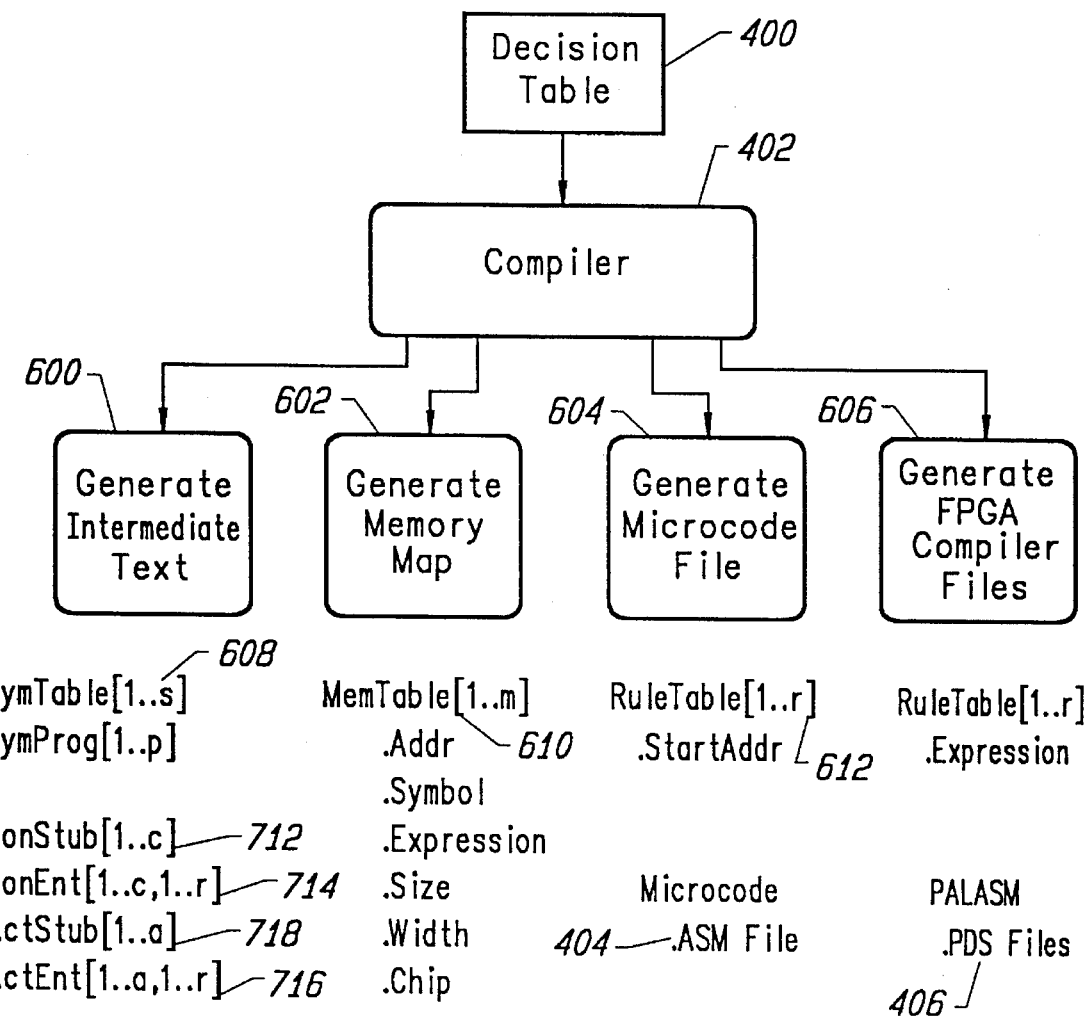

FIG. 5A shows a breakdown of the compiling stages for producing both the .ASM 404 and .PDS 406 files. Module 600 produces the symbol table 608 as well as intermediate forms 712, 714, 716, 718 for all four quadrants of the decision table. Module 602 produces a memory table 610 which specifies the locations, size and type for each variable and expression. With this information, Module 604 generates the microcode source file 404 (.ASM) which contains the necessary move instructions for performing the assignment statements for each rule. With this, the starting addresses for each rule are known and Module 606 can produce the associated PALASM source file, Programmable Array Logic Assembler (.PDS) source files 406.

FIG. 5B shows an example of the memory table 610 produced by Module 602. In this example, the memory table shown is for a bubble sort program implemented using the present invention.

FIG. 5C shows an example of the microcode source file 404 produced by Module 604. The assembly level source program shown are the assignment statements and jump instructions used to execute each of the rules (Rule 1 through Rule 5) for the bubble sort program.

FIG. 5D is a conceptual diagram of the address rule computations programmed into the FPGA via the PALASM file 406 for computing the address of the next rule to be executed by the main (i.e., minimal) processor. The address for the next rule to be executed by the minimal processor is computed by the FPGA during the execution of the current rule, and the computed next rule address is accessed by the minimal processor at the "@ rule" address, which is assigned to address 0002 in the example shown in FIGS. 5B and 5D and in Appendices 1, 2 and 3.

Appendix 1 is a compiler output listing for the bubble sort program that contains both a functional memory map and an execution table for the minimal processor.

Appendix 2 represents the assembly language level source code produced by the present invention for the bubble sort program. This source code represents the program for the rules that is executed by the minimal processor.

Appendix 3 is an example of a PALASM file for the bubble sort program. Note that the variables "t" and "t1" in the FIG. 5B and 5C are represented by "a[j]" and "a[j+1]" respectively in the Appendices.

Figure 6:
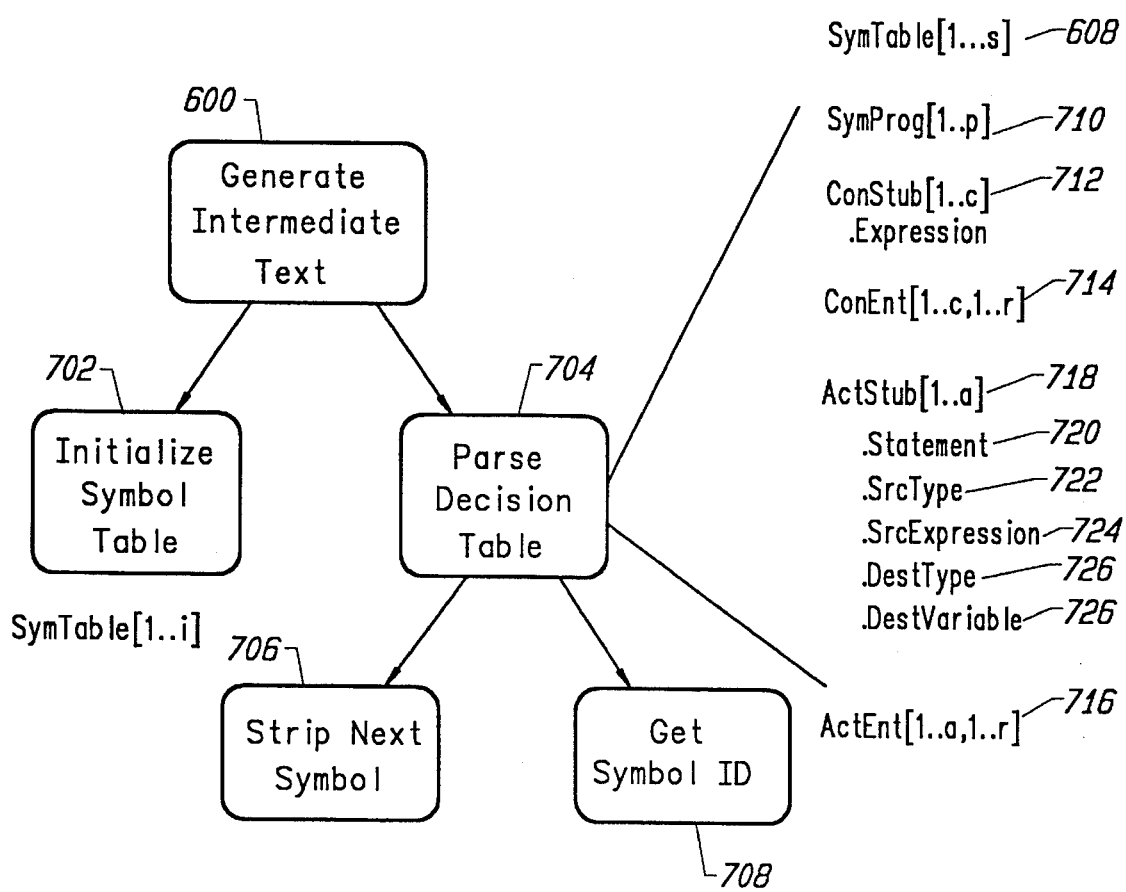
FIG. 6 illustrates the Intermediate Text generation hierarchy chart.

FIG. 6 illustrates the generation of an intermediate text hierarchy chart. As described above, the main function of module 600 is to produce the symbol table 608 and to record the stubs and entries of the decision table in respective arrays. After the symbol table has been initialized (step 702) with all reserved words and character strings, the decision table file is parsed (step 704) and an array of symbol IDs 710 (SymProg) is created from text file. The ConStub 712 array contains the condition stub expressions as a string. The ConEnt two dimensional array 714 contains the condition entries by condition stub (rows) and rule (columns). The ActEnt 716 is a similarly dimensioned array containing the action stub entries.

The ActStub array 718 contains several fields. The .Statement field 720 contains the full action stub as a string. The .SrcType field 722 contains the data type on the right side of the assignment (:=) symbol. The .SrcExpression field 724 contains the right side expression of the assignment statement. The .DestType field 726 indicates whether the left side variable is a scalar or an array element. The .DestVariable field 728 contains the destination variable symbol.

Parsing the decision table 704 relies on a subroutine which strips (step 706) the next symbol off the decision table text-file and one which inserts (step 708) new symbols into the symbol table 608 and retrieves their table index.

Figure 7:
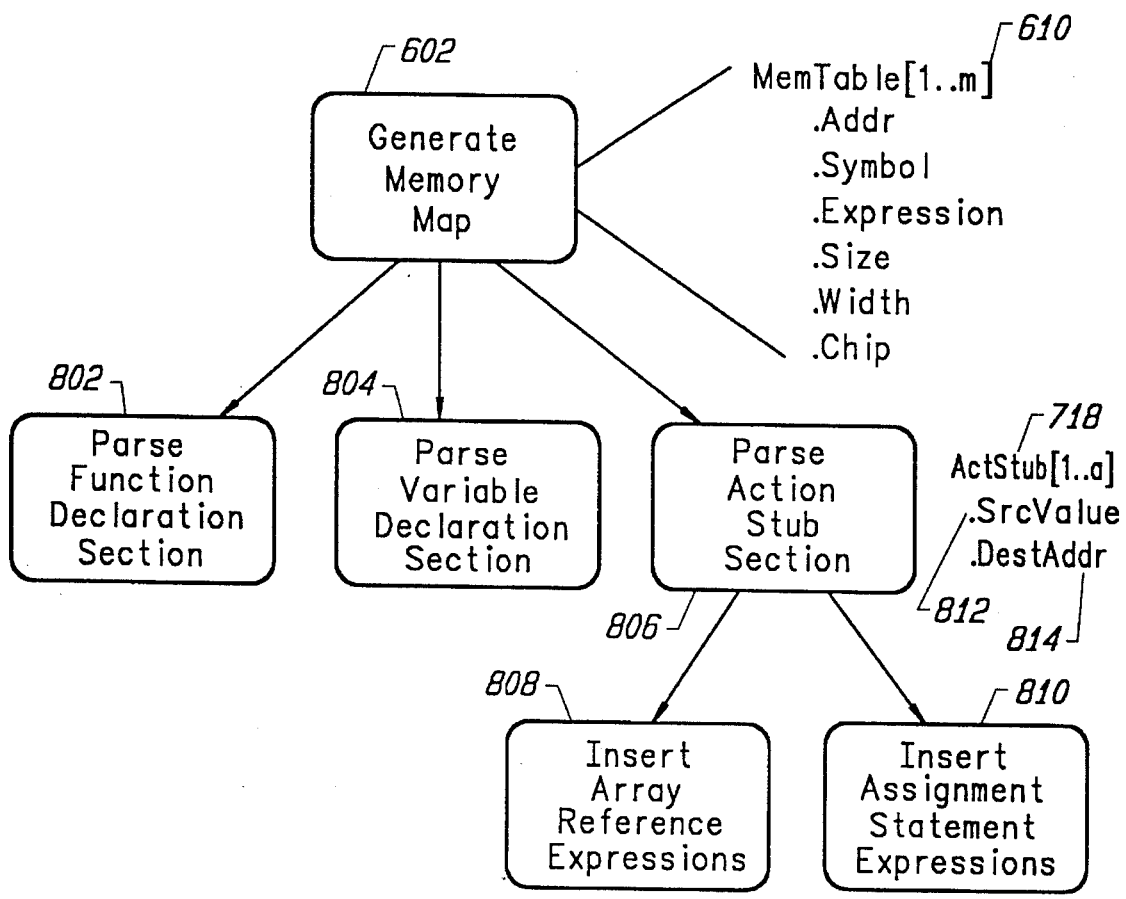
FIG. 7 illustrates the memory map generation hierarchy chart.

FIG. 7 shows the hierarchy chart for the module 602 that generates the functional memory map. An example of a functional memory map is shown in FIG. 5B and Appendix 1. There are three stages in the process of generating the memory map 602. First the function declaration section of the decision table is parsed 802. A function declaration allows the input and output addresses for a special function to be allocated so the rest of the decision table can reference those addresses. Module 804 parses the variable declaration section of the decision table. Addresses are allocated for each variable declared. Module 806 parses the action stubs statements to allocate locations for array address 808 and assignment statement expression 810 calculation. Module 806 also produces the source 812 and destination values 814 for each action stub 718.

Figure 8:
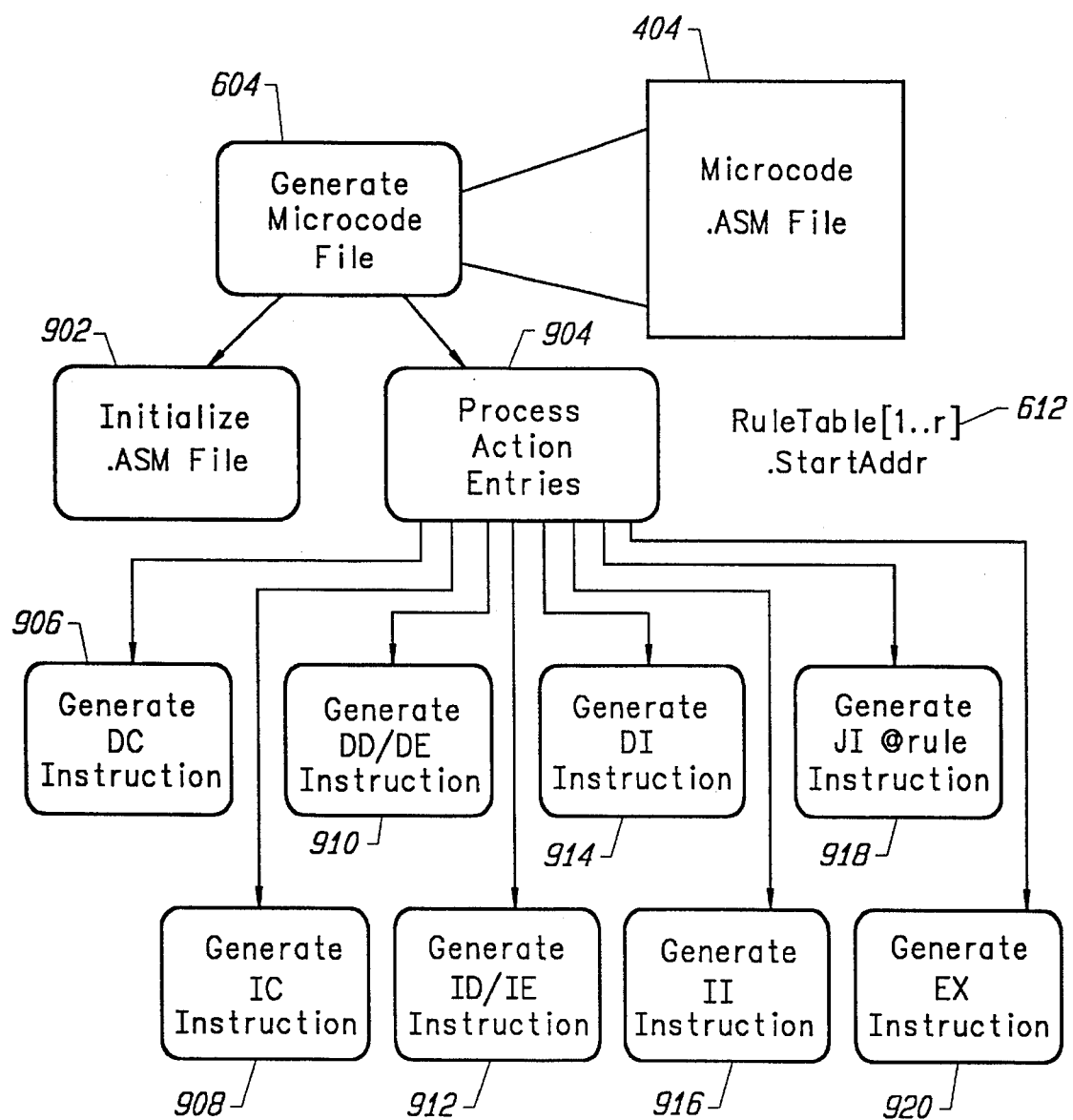
FIG. 8 illustrates the microcode generation hierarchy chart.

FIG. 8 illustrates the microcode generation hierarchy chart. Module 604 generates the microcode file containing the assembly language source code 404 for the set of move instructions for each rule. Note that while the Figures and Appendices herein show addresses assigned to the microcode statements, those addresses are actually assigned later in the microcode generation process, as described below.

As FIG. 8 illustrates, module 604 relies on module 902 for initializing the microcode .ASM file 404 and module 904 for processing the action entries for each rule. Module 904 expands each minimal processor instruction type into the mnemonic microinstruction codes for implementing that action stub assignment using eight small subroutines, one for each type. The subroutines are: Generate DC instruction 906, Generate IC instruction 908, Generate DD/DE instruction 910, Generate ID/IE instruction 912, Generate DI instruction 914, Generate II instruction 916, Generate JI @ rule instruction 918, and Generate EX instruction 920. With each instruction expanded, the rule starting addresses are recorded in the Rule Table array 612. In alternate embodiments of the minimal processor, the software generated for the minimal processor would not necessarily be microcoded instructions.

Figure 9:
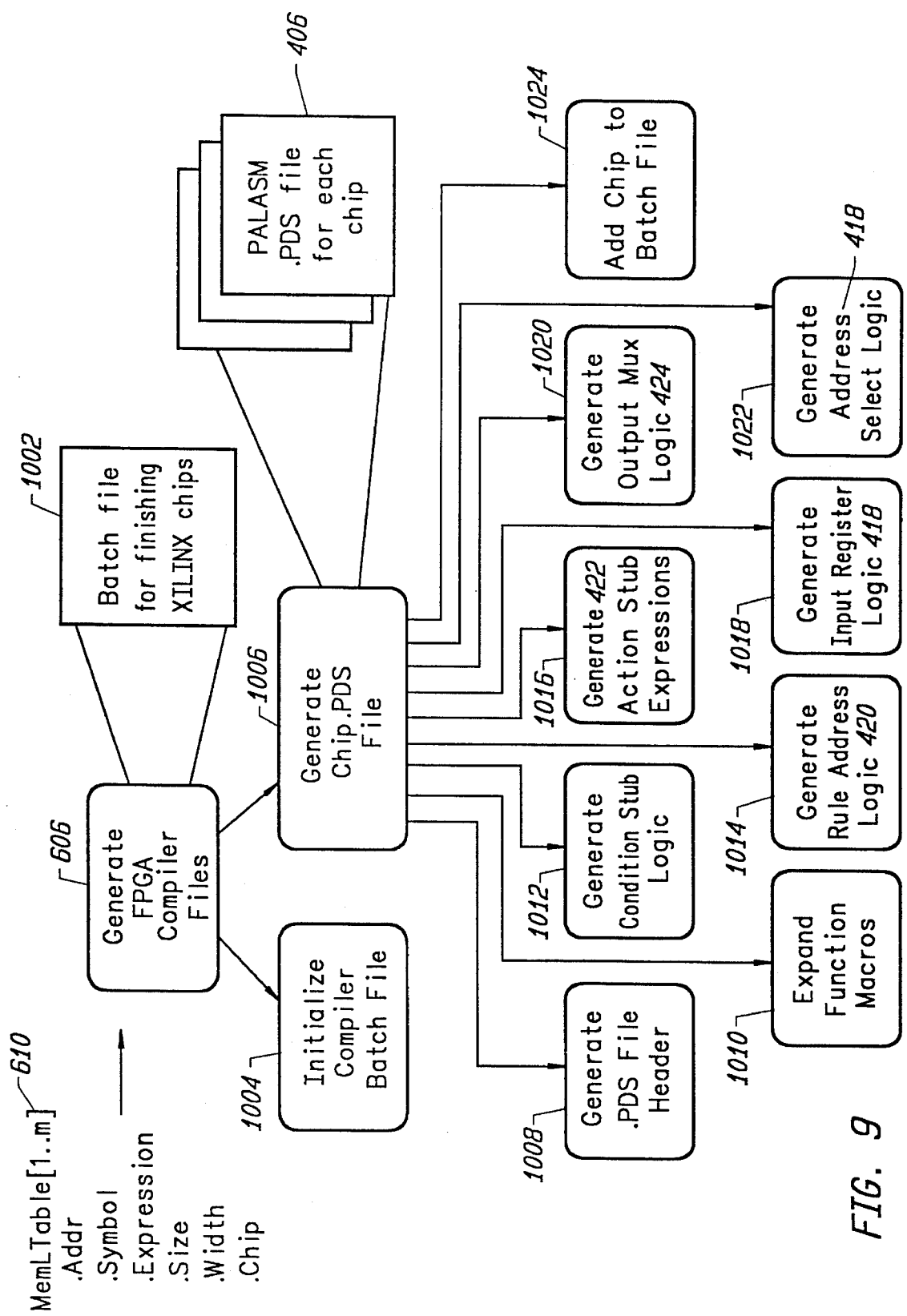
FIG. 9 illustrates the field programmable gate array PALASM file generation hierarchy chart.

FIG. 9 illustrates the field programmable gate array PALASM files generation hierarchy chart. Module 606 uses the Memory table 610 as its primary input. It relies on two main subroutines for generating up to four field prog gate arrays .PDS 406 files and the batch file 1002 for completing the compilation process for each FPGA chip. Module 1004 executes once initializing the batch file and Module 1006 executes once for each FPGA chip, generating a PALASM .PDS file 406 for that chip. Module 1006 relies on nine subroutines for generating the PALASM 406 for one FPGA (e.g., XILINX) chip. Module 1008 executes first for each chip, opening a new .PDS file and storing the necessary header information.

Module 1010 expands any function macros that are declared using a "func" declaration. Module 1012 generates the equations for evaluating the condition stubs. This logic is always implemented in the first field programmable gate array chip and feeds the condition stub results to the logic generated in Module 1014 which computes the rule address 420 (@ rule). See FIG. 5D which shows an example of how rule addresses are computed by the FPGA for a bubble sort program having 5 rules. Module 1016 generates the expression logic 422 which computes the right sides of assignment statements and array reference addresses. As expression logic is being generated for each chip, variables are marked for module 1018 which generates the input register logic 418. Module 1020 generates the output multiplexer logic 424 for all the expressions that are implemented in this chip. Finally module 1022 generates the address select logic 416 for all the input registers and output multiplexers allocated in this chip. With the PALASM file for the chip completed and closed, module 1024 adds its name to the batch file for producing the field programmable load module. An example of a PALASM file for a bubble sort program is shown in Appendix 3.

Figure 10:
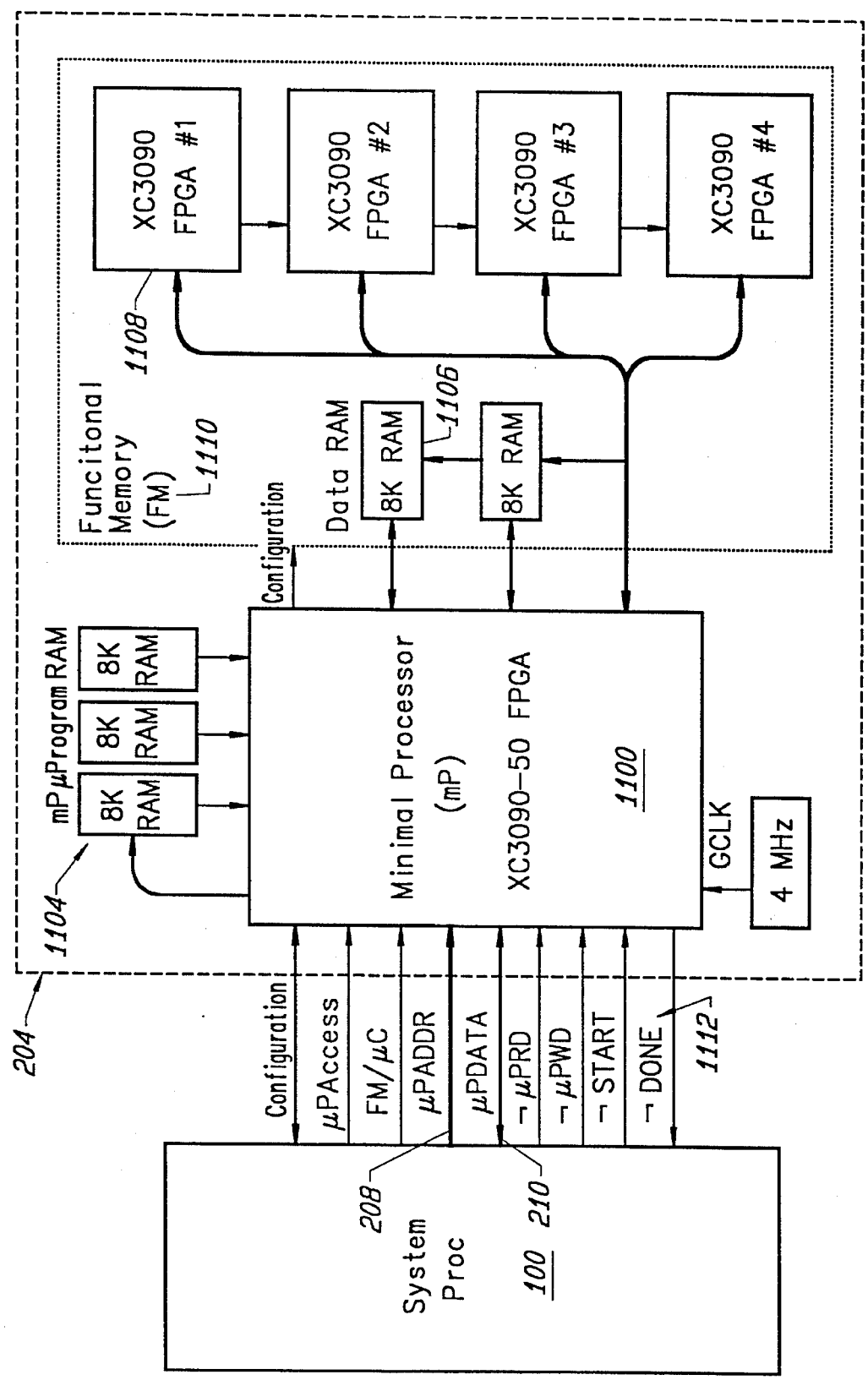
FIG. 10 illustrates a block diagram of a functional memory.

FIG. 10 is the block diagram of the functional computer memory add-on-board. This board 204 plugs into the system bus of the system processor 100. It is added in parallel on the same address bus 208 as the RAM. The board 204 contains a microprogrammable minimal processor (mP) 1100 implemented using a field programmable gate array with three 8192 byte microprogram RAMs 1104. The minimal processor 1100 is connected to data RAMs 1106. The data RAMs 1106 are connected to the field programmable gate arrays 1108. The functional memory 1110 consists of the data RAMs 1106 connected in parallel to the field programmable gate arrays 1108. This board is initialized and controlled by the system processor 100. START/DONE handshake signals on bus lines 1112 begin program execution and notify the system processor 100 when execution terminates.

Figure 11:
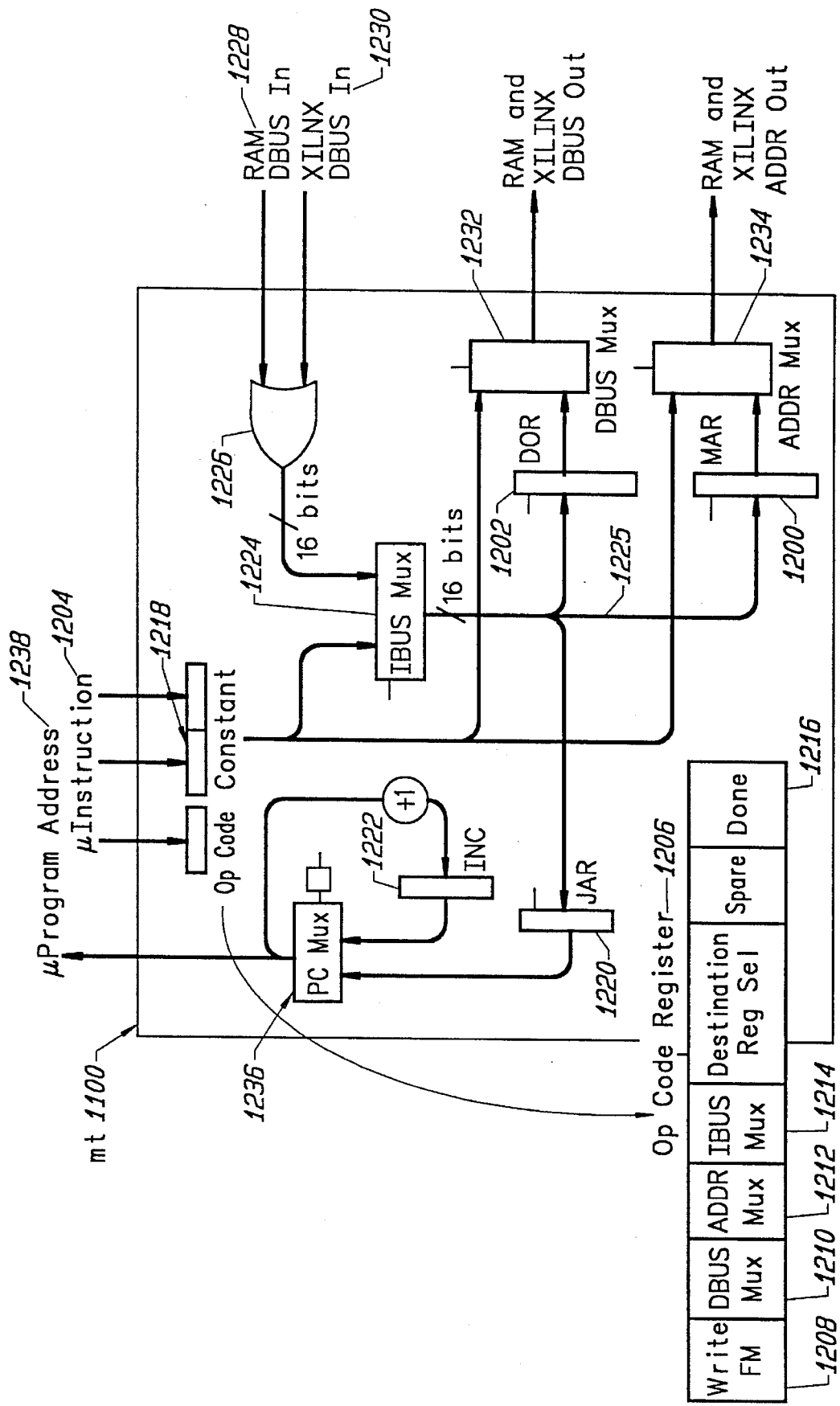
FIG. 11 illustrates the architecture of the minimal processor.

FIG. 11 illustrates the architecture of the minimal processor. The Minimal processor is designed only to move memory words from location to location. The microprogram address 1238 on top selects a three-byte microinstruction 1204 in the microprogram RAMs, which is clocked into the microinstruction register as shown. The first byte of the microinstruction 1204 is the op code field 1206 which includes subfields 1208 for initiating reads and writes, 1210 and 1212 for controlling data and address bus multiplexers 1232 and 1234, and 1214 for controlling an internal data bus multiplexer 1224. It also contains the DONE flag 1216, used for indicating to the main processor that the microprogram has terminated. The microinstruction register 1204 also contains a two byte constant field 1218 which can supply a functional memory address, functional memory data or a microprogram jump address.

The Minimal processor 1100 contains four other registers: the Data Output Register (DOR) 1202, for latching data to be written into functional memory; the Memory Address Register (MAR) 1200 for latching a functional memory address for reading or writing functional memory 1110; the Jump Address Register (JAR) 1220 which stores a program jump address; and the Incriminator Register (INC) 1222 which stores the current microprogram counter value plus one for program sequencing. The IBUS multiplexer 1224 asserts on an internal data bus (IBUS) 1225 either the microinstruction constant field 1218 or the logical OR 1226 of the RAM output 1228 and field programmable gate array output 1230 when reading functional memory. Data on the IBUS 1225 can be clocked into the data output register 1202, memory address register 1200 or jump address register 1220. The output of the DBUS multiplexer 1232 drives the data bus when writing to the functional memory. It can select either from the data output register 1202 or the microinstruction constant field 1218. Similarly, the ADDR multiplexer 1234 drives the functional memory address lines and can select from either the memory address register 1200 or the microinstruction constant field 1218. The program counter multiplexer 1236 determines the microprogram address 1238 to be used for fetching the next microinstruction to execute. The program counter multiplexer 1236 can gate either the contents of the jump address register 1220 for a jump or the increment register 1222 for sequentially accessing the next microinstruction.

FIG. 12 illustrates the microinstruction control register. The OP code Register 1206 consists of seven relevant bits which provide signals for gating multiplexer paths for moving operands between the registers and the functional memory. The "Write FM" 1208 activates the write signal to the functional memory. The data to be written originates either from the microinstruction constant field 1218 or the data output register DOR 1202, depending on the state of the DBUS Mux bit 1210. The address to be written originates from either the microinstruction constant field 1218 or the memory address register MAR 1200, depending on the state of he ADDR Mux bit 1212. The IBUS Mux bit 1214 specifies the content of the minimal processor's internal data bus (IBUS), which can receive either the contents of the microinstruction constant field 1218 or the contents of the external RAM/XILINX data bus 1228, 1230.

The content of the internal data bus can be clocked into the data output register DOR 1202, which occurs when the Destination Register Select (DRS) bits 1300 are equal to "01". When the DRS bits 1300 are equal to "10" the memory address register MAR 1200 gets clocked, and when DRS bits 1300 are equal to "11" the program counter receives the contents of the internal data bus. When Done bit 1216 is equal to 1, the main processor receives a signal indicating that the minimal processor is done executing.

Figure 13:
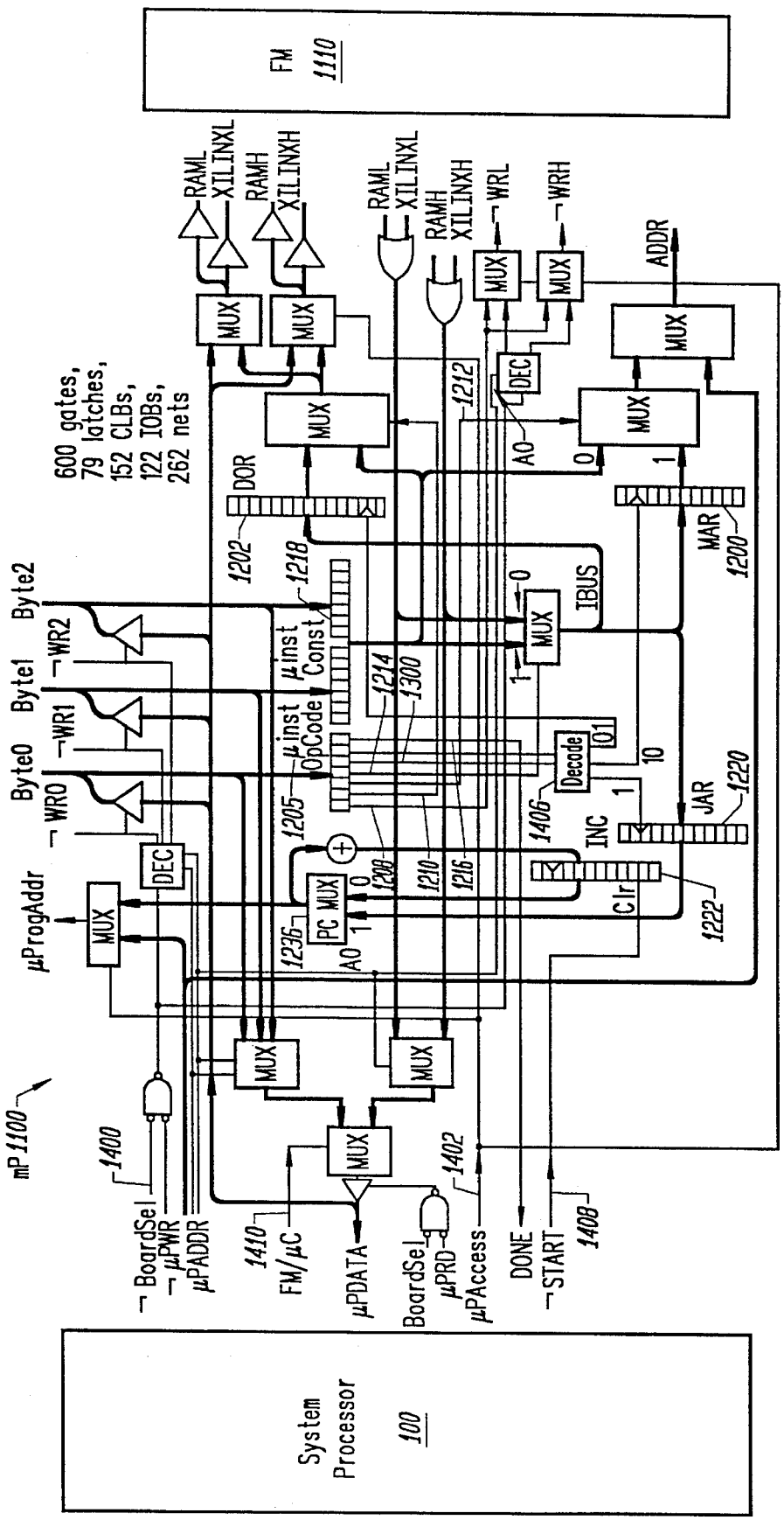
FIG. 13 illustrates the detailed block diagram of the minimal processor.

FIG. 13 is a detailed block diagram of the minimal processor 1100. When the board is selected 1400 (BoardSel= 0) the uPAccess line 1402 from the system processor 100 controls the set of outer multiplexers used to switch the processor into "transparent mode", allowing the system processor 100 to access directly either the microprogram RAMs or the functional memory 1110. The uPAccess signal line is necessary for loading the microprogram and initializing data values and arrays in functional memory 1110.

FIG. 13 illustrates how the opcode register 1206 is logically decoded. The first opcode register bit 1208 controls the write signal to the functional memory 1110. The second bit 1210 controls the multiplexer that selects whether the data bus lines to the functional memory 1110 are driven by the data output register (DOR) 1202 or the microinstruction constant register 1218. The third opcode register bit 1212 selects whether the address bus to the functional memory 1110 is driven by the memory address register (MAR) 1200 or the constant register 1218. The forth opcode bit 1214 selects which source drives the internal bus (either the constant register 1218 or the external data bus from the functional memory 1110). The fifth and sixth bits 1300 are decoded 1406 to select which register, if any, is clocked with new data from the internal bus. If the fifth and the sixth bits are 01, 10 or 11, the Data Output Register DOR 1202, Memory Address Register MAR 1200 or jump address register JAR 1220 clock is enabled, respectively. The last bit of the OP code 1206 is the DONE bit 1216. Once the minimal processor 1100 is done executing, a "DONE" signal is sent to the system processor 100. The minimal processor 1100 interfaces directly to the system processor 100.

Figure 14:
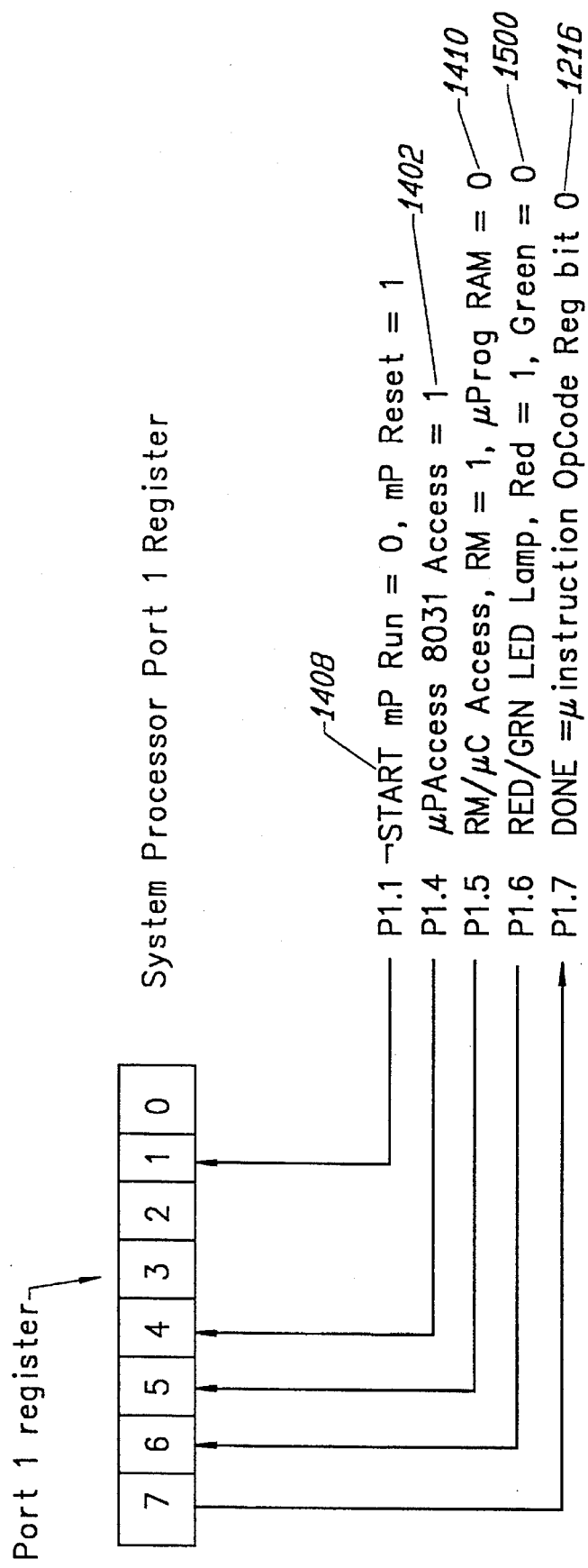
FIG. 14 illustrates the main processor and minimal processors interface.

FIG. 14 shows the interface between the minimal processor and the main processor. The minimal processor 1100 control bits are connected directly to the system processor's Port 1 register. All the bits are set to a '1' state when the machine is reset. Bit 1 connects to the START signal 1408 of the minimal processor 1100. When START=1, the mP's uProgAddr (microprogram RAM address) bus is held at zero. Setting START=0 allows the minimal processor 1100 to execute. When the signal on uPAccess line 1402 is equal to 1, it disconnects the minimal processor 1100 from the microprogram RAM and functional memory, allowing the system processor direct access. When the FM/uC signal 1410 is equal to 1 the system processor 100 can access the functional memory directly, and when FM/uC signal 1410 is equal 0 the system processor 100 can access the microprogram RAMs. When the signal on uPAccess line 1402 is equal to 0, it disconnects the system processor and allows the minimal processor normal access to the microprogram RAM. Functional memory RED/GRN signal 1500 controls the color of a light emitting diode (LED, not shown) on the system processor board. DONE bit 1216 is connected directly to bit 0 of the microinstruction opcode register and is used to signal the system processor 100 when the minimal processor 1100 has finished executing a program.

The Port 1 register uses "open collector" input ports (i.e., they have built in pull up resistors or transistors) and thus all the bits of Port 1, including the Done bit are set to "1" unless an external device pulls the data lines going to Port 1 to a low voltage. As a result, the Done bit 1216 is held low by the minimal processor (or by the FPGAs when the FPGAs are used to directly control the Done bit line 1216) until the program being executed finishes executing a program, at which time a "1" is asserted on the DONE bit line 1216.

FIG. 15 defines a minimal set of move and control instructions for implementing any program using the minimal processor 1100 discussed above. Program assignment statements consist of a term on the right side of the assignment symbol ":=" whose value must be fetched or computed, and a variable on the left side that indicates where the right side value is to be stored. The right side term may be a constant, a variable, or the result of a computed expression generated by the functional memory. Using the functional memory, computed expressions are accessed just like other variables. Array element addresses must also be computed before the particular element can be accessed. The functional memory computes the address of the element and the processor uses that address to access the element. To perform many standard computational functions, the processor must not only be able to store constants and to access functional memory via a specific address, it also must be able to read and write locations indirectly. For program control, the processor minimally must be able to sequence, jump to a location computed in functional memory and halt.

The DC instruction is used to store a constant into a scalar variable location. First it loads the constant (from the microinstruction constant field) into the data output register (DOR). Then, a write transaction is initiated, storing the contents of the data output register into the variable location.

The DD and DE instructions are used to store the contents of a scalar variable or computed expression into another scalar variable. First the data output register is loaded by specifying the source variable or expression address in the microinstruction constant field and initiating a functional memory read. Then, the contents of the data output register are written into functional memory.

A DI instruction is used for storing the contents of an array element into a scalar variable. First the location containing the array element address is read and stored into the Memory Address Register (MAR). Then, the contents of the location specified in the memory address register is read and stored in the data output register. The data output register now contains the array element value. Finally, the contents of the data output register are stored into the destination location. This instruction is also used in cases where an array element is required for an expression calculation, but the array itself is not stored in the field programmable gate array. In this case, a separate location is allocated for each array reference appearing in an expression.

An IC instruction is used to load an array element with a constant. First the location containing the array element address is read and stored into the memory address register. Then, the constant value is written into the address specified by the memory address register.

The ID and IE instructions store the value of a scalar variable or a computed expression into an array element. First the memory address register is loaded with the array element address from functional memory. Then, the data output register is loaded with the scalar variable or expression value from functional memory. Finally, the value in the data output register is written in the address specified in the memory address register.

The II command is used for moving one array element to another. First the memory address register is loaded with the address of the source element read from functional memory. Second, the source element, as specified in the memory address register is read from functional memory and loaded into the data output register. Third the memory address register is loaded with the address of he destination element from functional memory. Fourth, with the data output register containing the source value and the memory address register containing the address of the destination element, a functional memory write operation is performed.

For program control, when any of the move instructions are being executed, the next microinstruction is implied to be the one following the one being executed. For program branching, a processor must be able to jump to program locations where the address is computed.

The JI instruction loads the microprogram counter with the contents of the functional memory location whose address is specified in the microinstruction constant field.

The EX instruction causes the processor to halt by entering an endless loop with the DONE signal held active, indicating to the system processor that the program has terminated.

Appendix 2 is an example of the minimal processor code for the bubble sort program.

As will be understood by those skilled in the art, the functional memory of the present invention is, in essence, a spreadsheet computer. Some memory mapped locations in the functional memory simply store data while others contain formulas and display expression results when read. Thus results of expressions appear at their own memory mapped addresses. Like spreadsheet cells, the memory mapped addresses assigned to the function memory's FPGAs can be programmed to be the calculated result of an expression for which other memory mapped locations are the arguments.

While the present invention has been described with reference to a few specific embodiments, the description is illustrative of the invention and is not to be register containing the address of the destination element, a functional memory write operation is performed.

For program control, when any of the move instructions are being executed, the next microinstruction is implied to be the one following the one being executed. For program branching, a processor must be able to jump to program locations where the address is computed.

The JI instruction loads the microprogram counter with the contents of the functional memory location whose address is specified in the microinstruction constant field.

The EX instruction causes the processor to halt by entering an endless loop with the DONE signal held active, indicating to the system processor that the program has terminated.

Appendix 2 is an example of the minimal processor code for the bubble sort program.

?? As will be understood by those skilled in the art, the functional memory of the present invention is, in essence, a spreadsheet computer. . . . ?? where most locations simply store data while others contain formulas and display expression results when read. Thus results of expressions appear at their own memory mapped addresses. Like spreadsheet cells, the memory mapped addresses assigned to the function memory's FPGAs can be programmed to be the calculated result of an expression for which other memory mapped locations are the arguments.

While the present invention has-been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX 1

PROGRAM LISTINGS

Input File

| | | | | | | | |
|---|---|---|---|---|---|---|---|
| var | n : integer; | | | | | | 'array size |
| | a : array[50] of integer; | | | | | | 'array to be sorted |
| | j, k : integer; | | | | | | 'inner, outer loop variables |
| | "a[j]", "a[j+1]" : integer; | | | | | | 'temporary scalars |
| dtbegin | 'bubble sort | | | | | | |
| lambda = | | 0 | 1 | 1 | 1 | 1 | |
| k = 1 | | — | T | F | F | F | 'outer loop k from n to 1 |
| j = k | | — | — | T | F | F | 'inner loop j from 1 to k |
| "a[j]" > "a[j+1]" | | — | — | — | T | F | 'test for out of order pair |

| | | | | | | |
|---|---|---|---|---|---|---|
| k := n | | X | — | — | — | — | 'initialize k to top of array |
| j := 1 | | X | — | X | — | — | 'start j at bottom |
| k := k − 1 | | — | — | X | — | — | 'decrement outer loop |
| a[j] := "a[j+1]" | | — | — | — | X | — | 'exchange |
| a[j+1] := "a[j]" | | — | — | — | X | — | |
| j := j + 1 | | — | — | — | X | X | 'increment inner index |
| "a[j]" := a[j] | | X | — | X | X | X | 'update temporary variables |
| "a[j+1]" := a[j+1] | | X | — | X | X | X | |
| exit | | — | X | — | — | — | 'exit |
| lambda := | | 1 | — | — | — | — | | dtend. 'bubble sort
Compilation Statistics:
    5 rules, 4 conditions, 10 actions
Functional Memory: 124 bytes
FPGA I/O: 6 inputs, 5 outputs
Microcode: 55 lines MC
FPGA PALASM:    168 CLBs (estimated)
                      1 chip Functional Memory Map

| Name | *Type | Assigned Chip | Address or Value | #Bits | Expression |
|---|---|---|---|---|---|
| lambda | R | 1 | 0000 | 2 | |
| @Rule | P | 1 | 0002 | 7 | |
| n | R | 0 | 0004 | 8 | |
| a | C | 0 | 0006 | 0 | |
| j | R | 1 | 006C | 8 | |
| k | R | 1 | 006E | 8 | |
| "a[j]" | R | 1 | 0070 | 8 | |
| "a[j+1]" | R | 1 | 0072 | 8 | |
| k−1 | E | 1 | 0074 | 8 | k − 1 |
| @a[j] | A | 1 | 0076 | 9 | a [ j ] |
| @a[j+1] | A | 1 | 0078 | 9 | a [ j + 1 ] |
| j+1 | E | 1 | 007A | 8 | j + 1 |

*Types
A-Indirect Address
C-Array Base Address
D-Function Macro Declaration
E-Expression Output
P-Microprogram Address
R-FPGA Input Register Execution Table

| Adr | Statement | mP | Dest | Src | Cyc |
|---|---|---|---|---|---|
| Rule1=/L1*/L0 | | | | | |
| 004: | k:=n | DD | 006E | 0004 | 2 |
| 00C: | j:=1 | DC | 006C | 0001 | 2 |
| 014: | "a[j]":=a[j] | DI | 0070 | 0076 | 3 |
| 020: | "a[j+1]":=a[j+1] | DI | 0072 | 0078 | 3 |
| 02C: | lambda:= | DC | 0000 | 0001 | 2 |
| 034: | goto @rule | JI | 0002 | | 2 |
| Rule2=/L1*L0*C2 | | | | | |
| 03C: | exit | EX | | | 2 |
| Rule3=/L1*L0*/C2*C3 | | | | | |
| 044: | j:=1 | DC | 006C | 0001 | 2 |
| 04C: | k:=k−1 | DE | 006E | 0074 | 2 |
| 054: | "a[j]":=a[j] | DI | 0070 | 0076 | 3 |
| 060: | "a[j+1]":=a[j+1] | DI | 0072 | 0078 | 3 |
| 06C: | goto @rule | JI | 0002 | | 2 |
| Rule4=/L1*L0*/C2*/C3*C4 | | | | | |
| 074: | a[j]:="a[j+1]" | ID | 0076 | 0072 | 3 |
| 080: | a[j+1]:="a[j]" | ID | 0078 | 0070 | 3 |
| 08C: | j:=j+1 | DE | 006C | 007A | 2 |
| 094: | "a[j]":=a[j] | DI | 0070 | 0076 | 3 |
| 0A0: | "a[j+1]":=a[j+1] | DI | 0072 | 0078 | 3 |
| 0AC: | goto @rule | JI | 0002 | | 2 |
| Rule5=/L1*L0*/C2*/C3*/C4 | | | | | |
| 0B4: | j:=j+1 | DE | 006C | 007A | 2 |
| 0BC: | "a[j]":=a[j] | DI | 0070 | 0076 | 3 |
| 0C8: | "a[j+1]":=[j+1] | DI | 0072 | 0078 | 3 |
| 0D4: | goto @rule | JI | 0002 | | 2 |
| 0DC: | | | | | |

APPENDIX 2

BUBBLE SORT MINIMAL PROCESSOR CODE

```
; MICROINSTRUCTION OPCODES
LDC    EQU    00000100B    ;DOR <-- constant
LDA    EQU    00010100B    ;DOR <-- (address)
LDM    EQU    00110100B    ;DOR <-- (MAR) used LDM,0
LMA    EQU    00011000B    ;MAR <-- (address)
WMD    EQU    11100000B    ;(MAR) <-- DOR
WAD    EQU    11000000B    ;(address) <-- DOR
WMC    EQU    10100000B    ;(MAR) <-- constant
JPI    EQU    00011100B    ;microPC <-- (address)
HALT   EQU    00001101B    ;DONE used HALT,$
NOP    EQU    00000000B    ;DELAY ONE CYCLE
       ORG    0000H
       DW     NOP,0
```

APPENDIX 2-continued
BUBBLE SORT MINIMAL PROCESSOR CODE

```
Rule1:   ; 04H
; DD k:=n
         DW    LDA, 00004H
         DW    WAD, 0006EH
; DC j:=1
         DW    LDC, 00001H
         DW    WAD, 0006CH
; DI "a[j]":=a[j]
         DW    LMA, 00076H
         DW    LDM, 0
         DW    WAD, 00070H
; DI "a[j+1]":=a[j+1]
         DW    LMA, 00078H
         DW    LDM, 0
         DW    WAD, 00072H
; DC lambda:=1
         DW    LDC, 1
         DW    WAD, 00000H
; Jump to next rule
         DW    JPI, 02H
         DW    NOP, 0
Rule2:   ; 03CH
; EX exit
         DW    HALT, $
         DW    HALT, $-4
Rule3:   ; 044H
; DC j:=1
         DW    LDC, 00001H
         DW    WAD, 0006CH
; DE k:=k−1
         DW    LDA, 00074H
         DW    WAD, 0006EH
; DI "a[j]":=a[j]
         DW    LMA, 00076H
         DW    LDM, 0
         DW    WAD, 00070H
; DI "a[j+1]":=a[j+1]
         DW    LMA, 00078H
         DW    LDM, 0
         DW    WAD, 00072H
; Jump to next rule
         DW    JPI, 02H
         DW    NOP, 0
Rule4:   ; 074H
; ID a[j]:="a[j+1]"
         DW    LHA, 00076H
         DW    LDA, 00072H
         DW    WMD, 0
```

APPENDIX 2-continued
BUBBLE SORT MINIMAL PROCESSOR CODE

```
; ID a[j+1]:="a[j]"
    DW   LMA, 00078H
    DW   LDA, 00070H
    DW   WMD, 0
; DE j:=j+1
    DW   LDA, 0007AH
    DW   WAD, 0006CH
; DI "a[j]":=a[j]
    DW   LHA, 00076H
    DW   LDM, 0
    DW   WAD, 00070H
; DI "a[j+1]":=a[j+1]
    DW   LMA, 00078H
    DW   LDM, 0
    DW   WAD, 00072H
; Jump to next rule
    DW   JPI, 02H
    DW   NOP, 0
Rule5:   ; 0B4H
```

APPENDIX 2-continued
BUBBLE SORT MINIMAL PROCESSOR CODE

```
; DE j:=j+1
    DW   LDA, 0007AH
    DW   WAD, 0006CH
; DI "a[j]":=a[j]
    DW   LMA, 00076H
    DW   LDM, 0
    DW   WAD, 00070H
; DI "a[j+1]":=a[j+1]
    DW   LMA, 00078H
    DW   LDM, 0
    DW   WAD, 00072H
; Jump to next rule
    DW   JPI, 02H
    DW   NOP, 0
    END
```

APPENDIX 3

BUBBLE SORT PALASM SOURCE CODE

```
;ADDRESS INPUT PINS (18)
A1 A2 A3 A4 A5 A6 A7 A8 A9 A10 A11 A12 A13 A14 A15
RDC WRLC WRHC ;READ, WRITE LOW BYTE, WRITE HIGH BYTE
;DATA INPUT PINS (18)
DI0 DI1 DI2 DI3 DI4 DI5 DI6 DI7 DI8 DI9 DI10 DI11 DI12 DI13 DI14 DI15
GCLK ZERO ;GLOBAL CLOCK, LOGICAL ZERO
;DATA OUTPUT PINS (17)
;    Note that these data output pins are active low
DO0 DO1 DO2 DO3 DO4 DO5 DO6 DO7 DO8 DO9 DO10 DO11 DO12 DO13 DO14 DO15
;DAISY-CHAIN OUTPUT ENABLE
DOEIN   ;DATA OUTPUT ENABLE (ACTIVE HIGH) FROM PREVIOUS CHIP
DOE     ;DATA OUTPUT ENABLE (ACTIVE HIGH) TO NEXT CHIP EQUATIONS
;compute condition stub C2 = (k = 1 )
e_03_ne0_1 =
(/reg_06E_0):+:(/(reg_06E_0*/reg_06E_0))+((reg_06E_1):+:(reg_06E_1*/reg_06E_1))
e_03_ne2_3 =
(/reg_06E_2):+:(reg_06E_2*/reg_06E_2))+((reg_06E_3):+:(reg_06E_3*/reg_06E_3))
e_03_ne4_5 =
(/reg_06E_4):+:(reg_06E_4*/reg_06E_4))+((reg_06E_5):+:(reg_06E_5*/reg_06E_5))
e_03_ne6_7 =
(/reg_06E_6):+:(reg_06E_6*/reg_06E_6))+((reg_06E_7):+:(reg_06E_7*/reg_06E_7))
e_03_0 = /(e_03_ne0_1+e_03_ne2_3+e_03_ne4_5+e_03_ne6_7)
C2 = e_03_0
;compute condition stub C3 = (j = k )
e_05_ne0_1 = ((reg_06C_0):+:(reg_06E_0))+((reg_06C_1):+:(reg_06E_1))
e_05_ne2_3 = ((reg_06C_2):+:(reg_06E_2))+((reg_06C_3):+:(reg_06E_3))
e_05_ne4_5 = ((reg_06C_4):+:(reg_06E_4))+((reg_06C_5):+:(reg_06E_5))
e_05_ne6_7 = ((reg_06C_6):+:(reg_06E_6))+((reg_06C_7):+:(reg_06E_7))
e_05_0 = /(e_05_ne0_1+e_05_ne2_3+e_05_ne4_5+e_05_ne6_7)
C3 = e_05_0
;compute condition stub C4 = ("a[j]" > "a[j+1]" )
e_07c2 =
(reg_070_1)*/(reg_072_1)+((reg_070_1)+/(reg_072_1))*((reg_070_0)*/(reg_072_0))
e_07c4_2_0 =
(reg_070_3)*/(reg_072_3)+((reg_070_3)+/(reg_072_3))*((reg_070_2)*/(reg_072_2))
e_07c4_2_1 =
(reg_070_3)*/(reg_072_3)+((reg_070_3)+/(reg_072_3))*((reg_070_2)+/(reg_072_2))
e_07c6_4_0 =
(reg_070_5)*/(reg_072_5)+((reg_070_5)+/(reg_072_5))*((reg_070_4)*/(reg_072_4))
e_07c6_4_1 =
(reg_070_5)*/(reg_072_5)+((reg_070_5)+/(reg_072_5))*((reg_070_4)+/(reg_072_4))
e_07c6 = e_07c6_4_0+e_07c6_4_1*(e_07c4_2_0+e_07c4_2_1*e_07c2)
e_07c8_6_0 =
(reg_070_7)*/(reg_072_7)+((reg_070_7)+/(reg_072_7))*((reg_070_6)*/(reg_072_6))
e_07c8_6_1 =
(reg_070_7)*/(reg_072_7)+((reg_070_7)+/(reg_072_7))*((reg_070_6)+/(reg_072_6))
e_07_0 = /(e_07c8_6_0+e_07c8_6_1*e_07c6)
C4 = e_07_0
;#Rule bits from L0, L1, C2, C3, C4
Rule1 = /L1*/L0       ;Starting at Microprogram Address 004
Rule2 = /L1*L0*C2     ;Starting at Microprogram Address 03C
Rule3 = /L1*L0*/C2*C3 ;Starting at Microprogram Address 044
Rule4 = /L1*L0*/C2*/C3*C4   ;Starting at Microprogram Address 074
Rule5 = /L1*L0*/C2*/C3*/C4  ;Starting at Microprogram Address 0B4
rule_2 = Rule1 + Rule2 + Rule3 + Rule4 + Rule5
rule_3 = Rule2
rule_4 = Rule2 + Rule4 + Rule5
rule_5 = Rule2 + Rule4 + Rule5
rule_6 = Rule3 + Rule4
rule_7 = Rule5
```

```
;compute action stub expression: k - 1
s_09_z := reg_06E_0*/reg_06E_0    ;define zero
s_09_z.clkf = wrlc
s_09_0 = /((reg_06E_0):+:/(/s_09_z))
s_09_1 =
((reg_06E_1):+:/(s_09_z)):+:((reg_06E_0)*/(/s_09_z)+((reg_06E_0)+/(/s_09_z)))
s_09c2 =
((reg_06E_1)*/(s_09_z))+((reg_06E_1)+/(s_09_z))*((reg_06E_0)*/(s_09_z)+((reg_06E_0)
+/(/s_09_z)))
s_09_2 = ((reg_06E_2):+:/(s_09_z)):+:s_09c2
s_09_3 =
((reg_06E_3):+:/(s_09_z)):+:((reg_06E_2)*/(s_09_z)+((reg_06E_2)+/(s_09_z))*s_09c2)
s_09c4_2_0 = ((reg_06E_3)*/(s_09_z))+((reg_06E_3)+/(s_09_z))*((reg_06E_2)*/(s_09_z))
s_09c4_2_1 = ((reg_06E_3)*/(s_09_z))+((reg_06E_3)+/(s_09_z))*((reg_06E_2)+/(s_09_z))
s_09_4 = ((reg_06E_4):+:/(s_09_z)):+:(s_09c4_2_0+s_09c4_2_1*s_09c2)
s_09s5_4_0 = (reg_06E_5):+:/(s_09_z):+:((reg_06E_4)*/(s_09_z))
s_09s5_4_1 = (reg_06E_5):+:/(s_09_z):+:((reg_06E_4)+/(s_09_z))
s_09_5 =
s_09s5_4_0*/(s_09c4_2_0+s_09c4_2_1*s_09c2)+s_09s5_4_1*(s_09c4_2_0+s_09c4_2_1*s_09c2)
s_09c6_4_0 = (reg_06E_5)*/(s_09_z)+((reg_06E_5)+/(s_09_z))*((reg_06E_4)*/(s_09_z))
s_09c6_4_1 = (reg_06E_5)*/(s_09_z)+((reg_06E_5)+/(s_09_z))*((reg_06E_4)+/(s_09_z))
s_09c6 = s_09c6_4_0+s_09c6_4_1*(s_09c4_2_0+s_09c4_2_1*s_09c2)
s_09_6 = (reg_06E_6):+:/(s_09_z):+:s_09c6
s_09_7 =
(reg_06E_7):+:/(s_09_z):+:((reg_06E_6)*/(s_09_z)+((reg_06E_6)+/(s_09_z))*s_09c6)
;compute address of array element: a [ j ]
a_0B_0 = reg_06C_0*/reg_06C_0
a_0B_1 = reg_06C_0
a_0B_2 = reg_06C_1
a_0B_3 = reg_06C_2
a_0B_4 = reg_06C_3
a_0B_5 = reg_06C_4
a_0B_6 = reg_06C_5
a_0B_7 = reg_06C_6
a_0B_8 = reg_06C_7
a_0D_z := a_0B_0*/a_0B_0    ;define zero
a_0D_z.clkf = wrlc
a_0D_0 = (a_0D_z):+:(a_0B_0)
a_0D_1 = ((/a_0D_z):+:(a_0B_1)):+:((a_0D_z)*(a_0B_0))
a_0Dc2 = ((/a_0D_z)*(a_0B_1))+((/a_0D_z)+(a_0B_1))*((a_0D_z)*(a_0B_0))
a_0D_2 = ((/a_0D_z):+:(a_0B_2)):+:a_0Dc2
a_0D_3 = ((a_0D_z):+:(a_0B_3)):+:((/a_0D_z)*(a_0B_2)+((/a_0D_z)+(a_0B_2))*a_0Dc2)
a_0Dc4_2_0 = ((a_0D_z)*(a_0B_3))+((a_0D_z)+(a_0B_3))*((a_0D_z)*(a_0B_2))
a_0Dc4_2_1 = ((a_0D_z)*(a_0B_3))+((a_0D_z)+(a_0B_3))*((/a_0D_z)+(a_0B_2))
a_0D_4 = ((a_0D_z):+:(a_0B_4)):+:(a_0Dc4_2_0+a_0Dc4_2_1*a_0Dc2)
a_0Ds5_4_0 = (a_0D_z):+:(a_0B_5):+:((a_0D_z)*(a_0B_4))
a_0Ds5_4_1 = (a_0D_z):+:(a_0B_5):+:((a_0D_z)+(a_0B_4))
a_0D_5 =
a_0Ds5_4_0*/(a_0Dc4_2_0+a_0Dc4_2_1*a_0Dc2)+a_0Ds5_4_1*(a_0Dc4_2_0+a_0Dc4_2_1*a_0Dc2)
a_0Dc6_4_0 = (a_0D_z)*(a_0B_5)+((a_0D_z)+(a_0B_5))*((a_0D_z)*(a_0B_4))
a_0Dc6_4_1 = (a_0D_z)*(a_0B_5)+((a_0D_z)+(a_0B_5))*((a_0D_z)+(a_0B_4))
a_0Dc6 = a_0Dc6_4_0+a_0Dc6_4_1*(a_0Dc4_2_0+a_0Dc4_2_1*a_0Dc2)
a_0D_6 = (a_0D_z):+:(a_0B_6):+:a_0Dc6
a_0D_7 = (a_0D_z):+:(a_0B_7):+:((a_0D_z)*(a_0B_6)+((a_0D_z)+(a_0B_6))*a_0Dc6)
a_0Dc8_6_0 = (a_0D_z)*(a_0B_7)+((a_0D_z)+(a_0B_7))*((a_0D_z)*(a_0B_6))
a_0Dc8_6_1 = (a_0D_z)*(a_0B_7)+((a_0D_z)+(a_0B_7))*((a_0D_z)+(a_0B_6))
a_0D_8 = (a_0D_z):+:(a_0B_8):+:(a_0Dc8_6_0+a_0Dc8_6_1*a_0Dc6)
;compute address of array element: a [ j + 1 ]
s_0F_z := reg_06C_0*/reg_06C_0    ;define zero
s_0F_z.clkf = wrlc
s_0F_0 = (reg_06C_0):+:/(s_0F_z)
s_0F_1 = ((reg_06C_1):+:(s_0F_z)):+:((reg_06C_0)*(/s_0F_z))
s_0Fc2 = ((reg_06C_1)*(s_0F_z))+((reg_06C_1)+(s_0F_z))*((reg_06C_0)*(/s_0F_z))
s_0F_2 = ((reg_06C_2):+:(s_0F_z)):+:s_0Fc2
s_0F_3 =
((reg_06C_3):+:(s_0F_z)):+:((reg_06C_2)*(s_0F_z)+((reg_06C_2)+(s_0F_z))*s_0Fc2)
s_0Fc4_2_0 = ((reg_06C_3)*(s_0F_z))+((reg_06C_3)+(s_0F_z))*((reg_06C_2)*(s_0F_z))
s_0Fc4_2_1 = ((reg_06C_3)*(s_0F_z))+((reg_06C_3)+(s_0F_z))*((reg_06C_2)+(s_0F_z))
s_0F_4 = ((reg_06C_4):+:(s_0F_z)):+:(s_0Fc4_2_0+s_0Fc4_2_1*s_0Fc2)
s_0Fs5_4_0 = (reg_06C_5):+:(s_0F_z):+:((reg_06C_4)*(s_0F_z))
s_0Fs5_4_1 = (reg_06C_5):+:(s_0F_z):+:((reg_06C_4)+(s_0F_z))
s_0F_5 =
s_0Fs5_4_0*/(s_0Fc4_2_0+s_0Fc4_2_1*s_0Fc2)+s_0Fs5_4_1*(s_0Fc4_2_0+s_0Fc4_2_1*s_0Fc2)
s_0Fc6_4_0 = (reg_06C_5)*(s_0F_z)+((reg_06C_5)+(s_0F_z))*((reg_06C_4)*(s_0F_z))
s_0Fc6_4_1 = (reg_06C_5)*(s_0F_z)+((reg_06C_5)+(s_0F_z))*((reg_06C_4)+(s_0F_z))
s_0Fc6 = s_0Fc6_4_0+s_0Fc6_4_1*(s_0Fc4_2_0+s_0Fc4_2_1*s_0Fc2)
```

```
s_OF_6 = (reg_06C_6):+:(s_OF_z):+:s_OFc6
s_OF_7 =
(reg_06C_7):+:(s_OF_z):+:((reg_06C_6)*(s_OF_z)+((reg_06C_6)+(s_OF_z))*s_OFc6)
a_011_0 = s_OF_0*/s_OF_0
a_011_1 = s_OF_0
a_011_2 = s_OF_1
a_011_3 = s_OF_2
a_011_4 = s_OF_3
a_011_5 = s_OF_4
a_011_6 = s_OF_5
a_011_7 = s_OF_6
a_011_8 = s_OF_7
a_013_z := a_011_0*/a_011_0    ;define zero
a_013_z.clkf = wrlc
a_013_0 = (a_013_z):+:(a_011_0)
a_013_1 = ((/a_013_z):+:(a_011_1)):+:((a_013_z)*(a_011_0))
a_013c2 = ((/a_013_z)*(a_011_1))+((/a_013_z)+(a_011_1))*((a_013_z)*(a_011_0))
a_013_2 = ((/a_013_z):+:(a_011_2)):+:a_013c2
a_013_3 =
((a_013_z):+:(a_011_3)):+:((/a_013_z)*(a_011_2)+((/a_013_z)+(a_011_2))*a_013c2)
a_013c4_2_0 = ((a_013_z)*(a_011_3))+((a_013_z)+(a_011_3))*((/a_013_z)*(a_011_2))
a_013c4_2_1 = ((a_013_z)*(a_011_3))+((a_013_z)+(a_011_3))*((/a_013_z)+(a_011_2))
a_013_4 = ((a_013_z):+:(a_011_4)):+:(a_013c4_2_0+a_013c4_2_1*a_013c2)
a_013s5_4_0 = (a_013_z):+:(a_011_5):+:((a_013_z)*(a_011_4))
a_013s5_4_1 = (a_013_z):+:(a_011_5):+:((a_013_z)+(a_011_4))
a_013_5 =
a_013s5_4_0*/(a_013c4_2_0+a_013c4_2_1*a_013c2)+a_013s5_4_1*(a_013c4_2_0-a_013c4_2_1*
a_013c2)
a_013c6_4_0 = (a_013_z)*(a_011_5)+((a_013_z)+(a_011_5))*((a_013_z)*(a_011_4))
a_013c6_4_1 = (a_013_z)*(a_011_5)+((a_013_z)+(a_011_5))*((a_013_z)+(a_011_4))
a_013c6 = a_013c6_4_0+a_013c6_4_1*(a_013c4_2_0+a_013c4_2_1*a_013c2)
a_013_6 = (a_013_z):+:(a_011_6):+:a_013c6
a_013_7 =
(a_013_z):+:(a_011_7):+:((a_013_z)*(a_011_6)+((a_013_z)+(a_011_6))*a_013c6)
a_013c8_6_0 = (a_013_z)*(a_011_7)+((a_013_z)+(a_011_7))*((a_013_z)*(a_011_6))
a_013c8_6_1 = (a_013_z)*(a_011_7)+((a_013_z)+(a_011_7))*((a_013_z)+(a_011_6))
a_013_8 = (a_013_z):+:(a_011_8):+:(a_013c8_6_0+a_013c8_6_1*a_013c6)
;compute action stub expression: j + 1
s_015_z := reg_06C_0*/reg_06C_0    ;define zero
s_015_z.clkf = wrlc
s_015_0 = (reg_06C_0):+:(/s_015_z)
s_015_1 = ((reg_06C_1):+:(s_015_z)):+:((reg_06C_0)*(/s_015_z))
s_015c2 = ((reg_06C_1)*(s_015_z))+((reg_06C_1)+(s_015_z))*((reg_06C_0)*(/s_015_z))
s_015_2 = ((reg_06C_2):+:(s_015_z)):+:s_015c2
s_015_3 =
((reg_06C_3):+:(s_015_z)):+:((reg_06C_2)*(s_015_z)+((reg_06C_2)+(s_015_z))*s_015c2)
s_015c4_2_0 =
((reg_06C_3)*(s_015_z))+((reg_06C_3)+(s_015_z))*((reg_06C_2)*(s_015_z))
s_015c4_2_1 =
((reg_06C_3)*(s_015_z))+((reg_06C_3)+(s_015_z))*((reg_06C_2)+(s_015_z))
s_015_4 = ((reg_06C_4):+:(s_015_z)):+:(s_015c4_2_0+s_015c4_2_1*s_015c2)
s_015s5_4_0 = (reg_06C_5):+:(s_015_z):+:((reg_06C_4)*(s_015_z))
s_015s5_4_1 = (reg_06C_5):+:(s_015_z):+:((reg_06C_4)+(s_015_z))
s_015_5 =
s_015s5_4_0*/(s_015c4_2_0+s_015c4_2_1*s_015c2)+s_015s5_4_1*(s_015c4_2_0+s_015c4_2_1*
s_015c2)
s_015c6_4_0 = (reg_06C_5)*(s_015_z)+((reg_06C_5)+(s_015_z))*((reg_06C_4)*(s_015_z))
s_015c6_4_1 = (reg_06C_5)*(s_015_z)+((reg_06C_5)+(s_015_z))*((reg_06C_4)+(s_015_z))
s_015c6 = s_015c6_4_0+s_015c6_4_1*(s_015c4_2_0+s_015c4_2_1*s_015c2)
s_015_6 = (reg_06C_6):+:(s_015_z):+:s_015c6
s_015_7 =
(reg_06C_7):+:(s_015_z):+:((reg_06C_6)*(s_015_z)+((reg_06C_6)+(s_015_z))*s_015c6)
;Input Registers and Constants
L0          := DI0       ;                 lambda input bit 0
L0.CLKF = WRLC        ;Write Clock
L0.CE   = sel_00      ;Clock Enable
L1          := DI1       ;                 lambda input bit 1
L1.CLKF = WRLC        ;Write Clock
L1.CE   = sel_00      ;Clock Enable
reg_06C_0   := DI0       ;                 j input bit 0
reg_06C_0.CLKF = WRLC ;Write Clock
reg_06C_0.CE   = sel_06C ;Clock Enable
reg_06C_1   := DI1       ;                 j input bit 1
reg_06C_1.CLKF = WRLC ;Write Clock
reg_06C_1.CE   = sel_06C ;Clock Enable
reg_06C_2   := DI2       ;                 j input bit 2
```

```
reg_06C_2.CLKF = WRLC          ;Write Clock
reg_06C_2.CE   = sel_06C        ;Clock Enable
reg_06C_3      := DI3           ;                  j input bit 3
reg_06C_3.CLKF = WRLC          ;Write Clock
reg_06C_3.CE   = sel_06C        ;Clock Enable
reg_06C_4      := DI4           ;                  j input bit 4
reg_06C_4.CLKF = WRLC          ;Write Clock
reg_06C_4.CE   = sel_06C        ;Clock Enable
reg_06C_5      := DI5           ;                  j input bit 5
reg_06C_5.CLKF = WRLC          ;Write Clock
reg_06C_5.CE   = sel_06C        ;Clock Enable
reg_06C_6      := DI6           ;                  j input bit 6
reg_06C_6.CLKF = WRLC          ;Write Clock
reg_06C_6.CE   = sel_06C        ;Clock Enable
reg_06C_7      := DI7           ;                  j input bit 7
reg_06C_7.CLKF = WRLC          ;Write Clock
reg_06C_7.CE   = sel_06C        ;Clock Enable
reg_06E_0      := DI0           ;                  k input bit 0
reg_06E_0.CLKF = WRLC          ;Write Clock
reg_06E_0.CE   = sel_06E        ;Clock Enable
reg_06E_1      := DI1           ;                  k input bit 1
reg_06E_1.CLKF = WRLC          ;Write Clock
reg_06E_1.CE   = sel_06E        ;Clock Enable
reg_06E_2      := DI2           ;                  k input bit 2
reg_06E_2.CLKF = WRLC          ;Write Clock
reg_06E_2.CE   = sel_06E        ;Clock Enable
reg_06E_3      := DI3           ;                  k input bit 3
reg_06E_3.CLKF = WRLC          ;Write Clock
reg_06E_3.CE   = sel_06E        ;Clock Enable
reg_06E_4      := DI4           ;                  k input bit 4
reg_06E_4.CLKF = WRLC          ;Write Clock
reg_06E_4.CE   = sel_06E        ;Clock Enable
reg_06E_5      := DI5           ;                  k input bit 5
reg_06E_5.CLKF = WRLC          ;Write Clock
reg_06E_5.CE   = sel_06E        ;Clock Enable
reg_06E_6      := DI6           ;                  k input bit 6
reg_06E_6.CLKF = WRLC          ;Write Clock
reg_06E_6.CE   = sel_06E        ;Clock Enable
reg_06E_7      := DI7           ;                  k input bit 7
reg_06E_7.CLKF = WRLC          ;Write Clock
reg_06E_7.CE   = sel_06E        ;Clock Enable
reg_070_0      := DI0           ;                  "a[j]" input bit 0
reg_070_0.CLKF = WRLC          ;Write Clock
reg_070_0.CE   = sel_070        ;Clock Enable
reg_070_1      := DI1           ;                  "a[j]" input bit 1
reg_070_1.CLKF = WRLC          ;Write Clock
reg_070_1.CE   = sel_070        ;Clock Enable
reg_070_2      := DI2           ;                  "a[j]" input bit 2
reg_070_2.CLKF = WRLC          ;Write Clock
reg_070_2.CE   = sel_070        ;Clock Enable
reg_070_3      := DI3           ;                  "a[j]" input bit 3
reg_070_3.CLKF = WRLC          ;Write Clock
reg_070_3.CE   = sel_070        ;Clock Enable
reg_070_4      := DI4           ;                  "a[j]" input bit 4
reg_070_4.CLKF = WRLC          ;Write Clock
reg_070_4.CE   = sel_070        ;Clock Enable
reg_070_5      := DI5           ;                  "a[j]" input bit 5
reg_070_5.CLKF = WRLC          ;Write Clock
reg_070_5.CE   = sel_070        ;Clock Enable
reg_070_6      := DI6           ;                  "a[j]" input bit 6
reg_070_6.CLKF = WRLC          ;Write Clock
reg_070_6.CE   = sel_070        ;Clock Enable
reg_070_7      := DI7           ;                  "a[j]" input bit 7
reg_070_7.CLKF = WRLC          ;Write Clock
reg_070_7.CE   = sel_070        ;Clock Enable
reg_072_0      := DI0           ;                  "a[j+1]" input bit 0
reg_072_0.CLKF = WRLC          ;Write Clock
reg_072_0.CE   = sel_072        ;Clock Enable
reg_072_1      := DI1           ;                  "a[j+1]" input bit 1
reg_072_1.CLKF = WRLC          ;Write Clock
reg_072_1.CE   = sel_072        ;Clock Enable
reg_072_2      := DI2           ;                  "a[j+1]" input bit 2
reg_072_2.CLKF = WRLC          ;Write Clock
reg_072_2.CE   = sel_072        ;Clock Enable
reg_072_3      := DI3           ;                  "a[j+1]" input bit 3
reg_072_3.CLKF = WRLC          ;Write Clock
```

```
reg_072_3.CE    = sel_072         ;Clock Enable
reg_072_4       := DI4            ;                 "a[j+1]" input bit 4
reg_072_4.CLKF  = WRLC            ;Write Clock
reg_072_4.CE    = sel_072         ;Clock Enable
reg_072_5       := DI5            ;                 "a[j+1]" input bit 5
reg_072_5.CLKF  = WRLC            ;Write Clock
reg_072_5.CE    = sel_072         ;Clock Enable
reg_072_6       := DI6            ;                 "a[j+1]" input bit 6
reg_072_6.CLKF  = WRLC            ;Write Clock
reg_072_6.CE    = sel_072         ;Clock Enable
reg_072_7       := DI7            ;                 "a[j+1]" input bit 7
reg_072_7.CLKF  = WRLC            ;Write Clock
reg_072_7.CE    = sel_072         ;Clock Enable
;Output Multiplexers
DO0t1 = s_09_0*sel_074 + a_0D_0*sel_076 ;   k-1, @a[j]
DO0t3 = a_013_0*sel_078 + s_015_0*sel_07A ; @a[j+1], j+1
DO0a1 = DO0t1 + DO0t3
DO0   = /(/RDC*(DO0a1))
DO1t1 = s_09_1*sel_074 + a_0D_1*sel_076 ;   k-1, @a[j]
DO1t3 = a_013_1*sel_078 + s_015_1*sel_07A ; @a[j+1], j+1
DO1a1 = DO1t1 + DO1t3
DO1   = /(/RDC*(DO1a1))
DO2t1 = rule_2*sel_02 + s_09_2*sel_074 ;  @Rule, k-1
DO2t3 = a_0D_2*sel_076 + a_013_2*sel_078 ; @a[j], @a[j+1]
DO2t5 = s_015_2*sel_07A ;  j+1
DO2a1 = DO2t1 + DO2t3 + DO2t5
DO2   = /(/RDC*(DO2a1))
DO3t1 = rule_3*sel_02 + s_09_3*sel_074 ;  @Rule, k-1
DO3t3 = a_0D_3*sel_076 + a_013_3*sel_078 ; @a[j], @a[j+1]
DO3t5 = s_015_3*sel_07A ;  j+1
DO3a1 = DO3t1 + DO3t3 + DO3t5
DO3   = /(/RDC*(DO3a1))
DO4t1 = rule_4*sel_02 + s_09_4*sel_074 ;  @Rule, k-1
DO4t3 = a_0D_4*sel_076 + a_013_4*sel_078 ; @a[j], @a[j+1]
DO4t5 = s_015_4*sel_07A ;  j+1
DO4a1 = DO4t1 + DO4t3 + DO4t5
DO4   = /(/RDC*(DO4a1))
DO5t1 = rule_5*sel_02 + s_09_5*sel_074 ;  @Rule, k-1
DO5t3 = a_0D_5*sel_076 + a_013_5*sel_078 ; @a[j], @a[j+1]
DO5t5 = s_015_5*sel_07A ;  j+1
DO5a1 = DO5t1 + DO5t3 + DO5t5
DO5   = /(/RDC*(DO5a1))
DO6t1 = rule_6*sel_02 + s_09_6*sel_074 ;  @Rule, k-1
DO6t3 = a_0D_6*sel_076 + a_013_6*sel_078 ; @a[j], @a[j+1]
DO6t5 = s_015_6*sel_07A ;  j+1
DO6a1 = DO6t1 + DO6t3 + DO6t5
DO6   = /(/RDC*(DO6a1))
DO7t1 = rule_7*sel_02 + s_09_7*sel_074 ;  @Rule, k-1
DO7t3 = a_0D_7*sel_076 + a_013_7*sel_078 ; @a[j], @a[j+1]
DO7t5 = s_015_7*sel_07A ;  j+1
DO7a1 = DO7t1 + DO7t3 + DO7t5
DO7   = /(/RDC*(DO7a1))
DO8t1 = a_0D_8*sel_076 + a_013_8*sel_078 ; @a[j], @a[j+1]
DO8a1 = DO8t1
DO8   = /(/RDC*(DO8a1))
;Address Select Logic
sel_00  = ASX0*ASH0*ASM0*ASL0     ;Select for lambda input
sel_02  = ASX0*ASH0*ASM0*ASL2     ;Select for @Rule output
sel_06C = ASX0*ASH0*ASM6*ASLC     ;Select for j input
sel_06E = ASX0*ASH0*ASM6*ASLE     ;Select for k input
sel_070 = ASX0*ASH0*ASM7*ASL0     ;Select for "a[j]" input
sel_072 = ASX0*ASH0*ASM7*ASL2     ;Select for "a[j+1]" input
sel_074 = ASX0*ASH0*ASM7*ASL4     ;Select for k-1 output
sel_076 = ASX0*ASH0*ASM7*ASL6     ;Select for @a[j] output
sel_078 = ASX0*ASH0*ASM7*ASL8     ;Select for @a[j+1] output
sel_07A = ASX0*ASH0*ASM7*ASLA     ;Select for j+1 output
ASX0 = /A12*/A13*/A14*/A15        ; Highest &H0
ASH0 = /A8*/A9*/A10*/A11          ; High &H0
ASM0 = /A4*/A5*/A6*/A7            ; Middle &H0
ASL0 = /A1*/A2*/A3                ; Low &H0
ASL2 = A1*/A2*/A3                 ; Low &H2
ASM6 = /A4*A5*A6*/A7              ; Middle &H6
ASLC = /A1*A2*A3                  ; Low &HC
ASLE = A1*A2*A3                   ; Low &HE
ASM7 = A4*A5*A6*/A7               ; Middle &H7
ASL4 = /A1*A2*/A3                 ; Low &H4

ASL6 = A1*A2*/A3                  ; Low &H6
ASL8 = /A1*/A2*A3                 ; Low &H8
ASLA = A1*/A2*A3                  ; Low &HA
```

What is claimed is:

1. A computer system comprising:
   a central processing unit, including memory access circuitry for asserting memory addresses and for writing and reading data to and from memory devices at asserted memory addresses;
   a functional memory coupled to the central processing unit's memory access circuitry, said functional memory including random access memory circuitry connected in parallel with field programmable gate array circuitry;
   said field programmable gate array circuitry coupled to said central processing unit so as to receive configuration data for configuring said field programmable gate array circuitry from said central processing unit, said configuration data defining what memory addresses said field programmable gate array circuitry will be responsive to and what computation functions said field programmable gate array circuitry will perform;
   said field programmable gate array circuitry including input registers for storing data received from said central processing unit when said central processing unit's memory access circuitry asserts a first set of memory addresses defined by said configuration data and result output circuitry for communicating the results computed by said field programmable gate array circuitry, said result output circuitry outputting result data to said central processing unit when said central processing unit's memory access circuitry asserts a second set of memory addresses defined by said configuration data; and
   said functional memory including access circuitry for routing data signals from said central processing unit to both said random access memory circuitry and said field programmable gate array circuitry in parallel, and for routing data signals from both said random access memory circuitry and said field programmable gate array circuitry to said central processing unit.

2. The computer system of claim 1 wherein said functional memory includes a multiplexer for selectively receiving data from said field programmable gate array circuitry and from said random access memory circuitry.

3. The computer system of claim 1 wherein said functional memory includes logic circuitry for logically ORing data output by said field programmable gate array circuitry and data output by said random access memory circuitry.

4. The computer system of claim 1, wherein
   said central processing unit and said field programmable gate array circuitry are programmed to execute a decision table program;
   said field programmable gate array circuitry is configured to perform a plurality of computations that include a computation for computing a program address to be used in a program branching instruction to be executed by said central processing unit, said field programmable gate array circuitry configured to output said computed program address when said central processing unit reads a first address in said functional memory;
   said central processing unit is programmed (A) to load into input registers in said field programmable gate array circuitry data required as inputs for said plurality of computations performed by said field programmable gate array circuitry, (B) to retrieve said program address computed by said field programmable gate array circuitry by reading said first address in said functional memory, and (C) to jump to said retrieved program address.

5. The computer system of claim 1, wherein
   said central processing unit and said field programmable gate array circuitry are programmed to execute a decision table program, said decision table program including a plurality of condition stubs comprising conditions capable of being evaluated as true/false based on specified input data, a set of condition entries for selecting one of a plurality of rules based on evaluations of said condition stubs, action entries comprising a plurality of selectable computations and action stubs for selecting one of said selectable computations to perform based on which of said plurality of rules is selected;
   said field programmable gate array circuitry is configured to (A) execute said plurality of condition stubs simultaneously to produce a first set of results, (B) evaluate said set of condition entries using said first set of results used as inputs select one of said plurality of rules, (C) based on said selected rule and said action entries, selecting ones of said action entries, and (D) performing the computations corresponding to said selected action entries;
   at least one of said action entries comprises a computation for computing a program address to be used in a program branching instruction to be executed by said central processing unit;
   said central processing unit is programmed to (A) load into input registers in said field programmable gate array circuitry data required as inputs to said condition stubs and said action entries programmed into said field programmable gate array circuitry, (B) retrieve said program address computed by said at least one action entry, and (C) jump to said retrieved program address.

6. The computer system of claim 1, further including a system data processor coupled to said central processing unit;
   said central processing unit comprising a minimal processor having a plurality of internal registers including a program counter register and at least one other register, said minimal processor further including data processing circuitry that executes only a reduced set of instructions consisting essentially of data move instructions for moving data between said registers in said minimal processor, said random access memory circuitry and said field programmable gate array circuitry, at least one program branching instruction including a program branching instruction for loading said program counter in said minimal processor with an address retrieved from said functional memory, and a program halt instruction for halting instruction execution by said minimal processor;
   said minimal processor including circuitry for enabling said system data processor to directly access said random access memory circuitry and said field programmable gate array circuitry so that said system data processor can load programs into said random access memory circuitry for execution by said minimal processor and can load configuration data into said field addressable programmable gate array circuitry.

7. The computer system of claim 6, wherein said functional memory is configured to operate as a spreadsheet computer such that memory locations in said random access memory circuitry and said input registers in said field programmable gate array circuitry store data while memory mapped locations in said field programmable gate array circuitry output expression results computed by said field programmable gate array circuitry as a function of data stored in said input registers.

8. The computer system of claim 6, wherein said minimal processor and said field programmable gate array circuitry are programmed to execute a decision table program, said decision table program including a plurality of condition stubs comprising conditions capable of being evaluated as true/false based on specified input data, a set of condition entries for selecting one of a plurality of rules based on evaluations of said condition stubs, action entries comprising a plurality of selectable computations and action stubs for selecting one of said selectable computations to perform based on which of said plurality of rules is selected;

said field programmable gate array circuitry is configured to (A) execute said plurality of condition stubs simultaneously to produce a first set of results, (B) evaluate said set of condition entries using said first set of results used as inputs select one of said plurality of rules, (C) based on said selected rule and said action entries, selecting ones of said action entries, and (D) performing the computations corresponding to said selected action entries;

at least one of said action entries comprises a computation for computing a program address to be used in a program branching instruction to be executed by said minimal processor;

said minimal processor is programmed to (A) load into input registers in said field programmable gate array circuitry data required as inputs to said condition stubs and said action entries programmed into said field programmable gate array circuitry, (B) retrieve said program address computed by said at least one action entry, and (C) jump to said retrieved program address.

9. The computer system of claim 1, said central processing unit comprising a minimal processor further including data processing circuitry that executes only a reduced set of instructions consisting essentially of data move instructions for moving data between said registers in said minimal processor, said random access memory circuitry and said field programmable gate array circuitry, at least one program branching instruction including a program branching instruction for loading said program counter in said minimal processor with an address retrieved from said functional memory, and a program halt instruction for halting instruction execution by said minimal processor.

10. The computer system of claim 9, wherein said functional memory is configured to operate as a spreadsheet computer such that memory locations in said random access memory circuitry and said input registers in said field programmable gate array circuitry store data while memory mapped locations in said field programmable gate array circuitry output expression results computed by said field programmable gate array circuitry as a function of data stored in said input registers.

11. The computer system of claim 9, wherein said minimal processor and said field programmable gate array circuitry are programmed to execute a decision table program, said decision table program including a plurality of condition stubs comprising conditions capable of being evaluated as true/false based on specified input data, a set of condition entries for selecting one of a plurality of rules based on evaluations of said condition stubs, action entries comprising a plurality of selectable computations and action stubs for selecting one of said selectable computations to perform based on which of said plurality of rules is selected;

said field programmable gate array circuitry is configured to (A) execute said plurality of condition stubs simultaneously to produce a first set of results, (B) evaluate said set of condition entries using said first set of results used as inputs select one of said plurality of rules, (C) based on said selected rule and said action entries, selecting ones of said action entries, and (D) performing the computations corresponding to said selected action entries;

at least one of said action entries comprises a computation for computing a program address to be used in a program branching instruction to be executed by said minimal processor;

said minimal processor is programmed to load into input registers in said field programmable gate array circuitry data required as inputs to said condition stubs and said action entries programmed into said field programmable gate array circuitry and is programmed to retrieve said program address computed by said at least one action entry and to jump to said retrieved program address.

\* \* \* \* \*